United States Patent
Nakamura

(10) Patent No.: US 8,482,940 B2
(45) Date of Patent: Jul. 9, 2013

(54) ILLUMINATION LIGHTING DEVICE, DISCHARGE LAMP LIGHTING DEVICE, AND VEHICLE HEADLAMP LIGHTING DEVICE USING SAME

(75) Inventor: Toshiaki Nakamura, Kadoma (JP)

(73) Assignee: Panasonic Corporation, Osaka (JP)

( * ) Notice: Subject to any disclaimer, the term of this patent is extended or adjusted under 35 U.S.C. 154(b) by 290 days.

(21) Appl. No.: 13/123,254

(22) PCT Filed: Oct. 26, 2009

(86) PCT No.: PCT/JP2009/068331
§ 371 (c)(1),
(2), (4) Date: Apr. 8, 2011

(87) PCT Pub. No.: WO2010/050432
PCT Pub. Date: May 6, 2010

(65) Prior Publication Data
US 2011/0193481 A1    Aug. 11, 2011

(30) Foreign Application Priority Data
Oct. 27, 2008 (JP) ................................. 2008-276179

(51) Int. Cl.
*H02M 3/335* (2006.01)
*H02M 7/44* (2006.01)

(52) U.S. Cl.
USPC ......... 363/21.12; 363/21.14; 363/16; 363/97; 315/294

(58) Field of Classification Search
USPC .................. 363/21.12–21.17, 20, 16, 89, 55, 363/97, 125; 315/82, 291, 294, 308
See application file for complete search history.

(56) References Cited

U.S. PATENT DOCUMENTS

| | | | |
|---|---|---|---|
| 5,706,185 A | 1/1998 | Toyama et al. | |
| 6,169,680 B1 * | 1/2001 | Matsui et al. | 363/21.05 |
| 6,344,984 B1 * | 2/2002 | Miyazaki | 363/60 |
| 7,859,860 B2 * | 12/2010 | Chen et al. | 363/16 |

(Continued)

FOREIGN PATENT DOCUMENTS

| | | |
|---|---|---|
| CN | 1456029 | 11/2003 |
| DE | 10 2005 018 761 | 10/2006 |
| JP | 59-12598 | 1/1984 |
| JP | 7-298613 | 11/1995 |
| JP | 8-8087 | 1/1996 |
| JP | 8-250289 | 9/1996 |

(Continued)

OTHER PUBLICATIONS

Search report from E.P.O., mail date is Mar. 5, 2012.

(Continued)

*Primary Examiner* — Vibol Tan
(74) *Attorney, Agent, or Firm* — Greenblum & Bernstein, P.L.C.

(57) ABSTRACT

A lighting device includes a power converter with an input and an output. The output connects to a load circuit that includes a lamp. An output of the power converter is regulated based on results of first and second current detectors. One end of the output and one end of the input are connected to one end of the load circuit via the first and second current detectors, respectively. Detection outputs of the current detectors are synthesized. A ground-fault current flows through a current pathway from one end of the input of the power converter to the one end of the output of the power converter via the current detectors. The current pathway is formed when a ground fault occurs at a load terminal of the load circuit. Detection signals of the current detectors result from the ground-fault current and are of additive polarities.

16 Claims, 14 Drawing Sheets

U.S. PATENT DOCUMENTS

| | | | |
|---|---|---|---|
| 7,898,826 B2 * | 3/2011 | Matthews | 363/21.17 |
| 8,081,496 B2 * | 12/2011 | Matthews | 363/21.17 |
| 8,139,384 B2 * | 3/2012 | Kung et al. | 363/97 |
| 8,144,487 B2 * | 3/2012 | Djenguerian et al. | 363/21.12 |
| 8,243,477 B2 * | 8/2012 | Polivka et al. | 363/21.14 |
| 8,259,097 B2 * | 9/2012 | Kim et al. | 345/212 |
| 8,300,431 B2 * | 10/2012 | Ng et al. | 363/21.12 |
| 2003/0111969 A1 | 6/2003 | Konishi et al. | |
| 2005/0046357 A1 | 3/2005 | Stack | |
| 2005/0146286 A1 | 7/2005 | Chan et al. | |
| 2005/0254266 A1 * | 11/2005 | Jitaru | 363/16 |
| 2008/0185979 A1 | 8/2008 | Miyazaki | |

FOREIGN PATENT DOCUMENTS

| | | |
|---|---|---|
| JP | 9-50893 | 2/1997 |
| JP | 11-162666 | 6/1999 |
| JP | 2006-252872 | 9/2006 |
| JP | 2007-295641 | 11/2007 |
| JP | 2008-235222 | 10/2008 |
| WO | 2006/111263 | 10/2006 |

OTHER PUBLICATIONS

Chinese Office Action dated Apr. 24, 2013.

* cited by examiner

ILLUMINATION LIGHTING DEVICE, DISCHARGE LAMP LIGHTING DEVICE, AND VEHICLE HEADLAMP LIGHTING DEVICE USING SAME

TECHNICAL FIELD

The present invention relates to an illumination lighting device, a discharge lamp lighting device, and a vehicle headlamp lighting device using the same. Particularly, the present invention relates to protective control performed when a ground fault occurs at output terminals.

BACKGROUND ART

Patent Document 1, for example, discloses a power control technology for converting a direct-current power supply, which is obtained by rectifying and smoothing a battery or an alternating current, into a power required by a discharge lamp, in order to stably light the discharge lamp. In this technology, a lamp current command value that is supplied to the discharge lamp is set based on a lamp voltage detection value, and the control variable of a power converter circuit configuring a discharge lamp lighting circuit is regulated based on the calculated difference between the control variable and a lamp current detection value.

A technology for suppressing a ground-fault current is shown in FIG. 15 (see Patent Document 2, for example). This technology is configured to alternate a direct-current output of a DC-DC converter circuit 11 by means of an inverter circuit 12 and supply thus obtained alternating-current power to a discharge lamp. The DC-DC converter circuit 11 is a power converter circuit with a function for regulating the power supplied to the discharge lamp. One end of an output terminal of the DC-DC converter circuit 11 is connected to one end of an input terminal of the inverter circuit 12 via a current sensing resistor R. A lamp current is detected using the current sensing resistor R. Moreover, the one end of the input of the inverter circuit 12 to which one end of the current sensing resistor R is connected is used as a circuit ground (earthing) terminal, and a voltage signal generated at the other end of the current sensing resistor R is used as a current detection signal and compared with a command value. Then, a PWM signal for controlling a switching element Q1 configuring the DC-DC converter circuit 11 is regulated by using a feedback circuit. With the configuration described above, even when a ground fault occurs at an output terminal of the discharge lamp lighting device as shown by a dashed line in FIG. 15, a ground-fault current flows through a closed circuit that extends from a ground-fault point, via a terminal on the grounded side of the power supply and definitely via the current sensing resistor R, to the output terminal of the DC-DC converter circuit 11. For this reason, is it possible to control the power including the ground-fault current, and also suppress the ground-fault current.

As shown in FIG. 16, this technology has a configuration in which two current sensing resistors R1, R2 are connected, a current to be supplied to the discharge lamp is detected in a series circuit of the resistors R1, R2, and the ground-fault current flows through the resistor R1. At the time of normal lighting, the voltage drop amount at each end of the series circuit of the resistors R1, R2 is the lamp current detection value. This value is detected by a difference amplifier A. Then the difference between this value and a command signal Vk is calculated, and the PWM signal for controlling the switching element Q1 is regulated. The ground-fault current flows only through the resistor R1. Since the voltage drop amount that results from the ground-fault current at the resistor R1 is input to the difference amplifier A through the resistor R2, it is possible to limit the ground-fault current. However, the disadvantage is that the ground-fault current becomes greater than the lamp current obtained at the time of lighting, because the sensing resistors become smaller than at the time of the normal lighting.

There is the following technology for protecting a discharge lamp lighting device from a ground-fault current (see Patent Document 3, for example). In this technology, current sensing resistors are connected as in the configuration shown in FIG. 15. If overcurrent flows even when a predetermined amount of time elapses after starting the discharge lamp lighting device, it is then determined that overcurrent resulting from a ground fault flows, and accordingly the discharge lamp lighting device is stopped, whereby this device is protected.

There is also the following technology for protecting a discharge lamp lighting device from a ground-fault current (see Patent Document 4, for example). This technology focuses on the fact that an output voltage increases up to a predetermined no-load secondary voltage that is higher than when the discharge lamp is in a steady lighting state, because a load current does not flow when the discharge lamp is in an unlit state. In the case where an output voltage or output current of the discharge lamp lighting device, which is generated when the discharge lamp is in the unlit state immediately after the discharge lamp lighting device starts operating, deviates from an assumed range, it is determined that a ground fault occurs at an output terminal, and the discharge lamp lighting device is stopped and accordingly protected. The case where the output voltage deviates from the assumed range means that the output voltage does not increase to a predetermined voltage within a predetermined time period when the output voltage supposedly increases to a no-load voltage. The case where the output current deviates from the assumed range means that a predetermined value or more of the load current does not flow during a predetermined time period when the output voltage supposedly increases to the no-load voltage.

CITATION LIST

Patent Literature

Patent Document 1: Japanese Patent Application Publication No. H08-008087

Patent Document 2: Japanese Patent Application Publication No. H07-298613

Patent Document 3: Japanese Patent Application Publication No. 1109-050893

Patent Document 4: Japanese Patent Application Publication No. 1108-250289

According to the technologies described in Patent Document 2 and Patent Document 3, even when a ground fault occurs, a ground-fault current can be detected by a lamp current detection circuit. When a ground fault occurs while the impedance of the ground-fault section is low, it is determined that the ground fault occurs because the overcurrent flows. On the other hand, when a ground fault occurs while there is a certain level of impedance resulting from the carbonization of a ground-fault section, it cannot be determined whether the ground fault occurs or not, because overcurrent does not flow. Furthermore, it is not possible to determine whether the flowing current is a current flowing through the load or a ground-fault current. Therefore, the disadvantage that is generated when overcurrent flows is the difficulty in determining whether a ground flow-current is generated, whether a short-circuit current flows, or whether there are many lamp currents due to a cold discharge lamp and hence the low lamp voltage.

The technology described in Patent Document 4 determines that a ground fault occurs in the discharge lamp that is turned off immediately after the operation is started, when the behavior of the output voltage or output current is different from a normal state thereof. Thus, in the discharge lamp that is turned off immediately after its operation is started, when the output polarity of the no-load voltage is fixed to one polarity, a ground fault that occurs at the one polarity of the output can be detected but a ground fault that occurs at the other polarity cannot be detected.

SUMMARY OF INVENTION

An object of the present invention is to accurately detect a ground fault that occurs when an output terminal of a lighting device has a certain level of impedance, and to perform a protective operation such as stopping the lighting device, in order to prevent damage to the lighting device. Another object of the present invention is to accurately detect a ground fault and perform a protective operation when a ground fault occurs at either side of the output terminal.

An illumination lighting device according to one aspect of the present invention is provided with: a power converter circuit having a configuration in which an input terminal to which a power supply can be connected and an output terminal to which a load circuit including at least a lamp can be connected are galvanically insulated, and having a power regulating function required by the lamp; output detection means which is provided at the output terminal of the power converter circuit and has first current detection means and second current detection means; and a control circuit for regulating an output of the power converter circuit based on a result of detection performed by the output detection means, wherein one end of the output of the power converter circuit is connected to one end of the load circuit via the first current detection means, one end of an input of the power converter circuit is connected to the one end of the load circuit via the second current detection means, the output detection means has the result of the detection which is a synthesized signal of detection outputs of the first current detection means and the second current detection means, a current pathway, through which a ground-fault current flows from the one end of the input of the power converter circuit to the one end of the output of the power converter circuit via the first current detection means and the second current detection means, is formed when a ground fault occurs at a load terminal of the load circuit, and a detection signal of the first current detection means and a detection signal of the second current detection means that result from the ground-fault current are of additive polarities.

According to this configuration, the detection signal of the first current detection means and the detection signal of the second current detection means, which result from the ground-fault current, are of additive polarities. Therefore, even when a ground fault occurs at either side of the output terminal to which the load circuit including the lamp is connected, or even when the ground fault occurs when there is a certain level of impedance, the amount of power supplied to the lamp can be reduced securely. Especially when the lamp is a discharge lamp, secure detection of the ground fault and a protective operation can be performed under the condition that the discharge lamp is turned off due to an insufficient amount of power supplied to the lamp due to the ground fault. The additive polarities mean that the polarities of the detection signals both of the first and second current detection means become positive or negative.

DESCRIPTION OF EMBODIMENTS (Embodiment 1)

Figure 1:
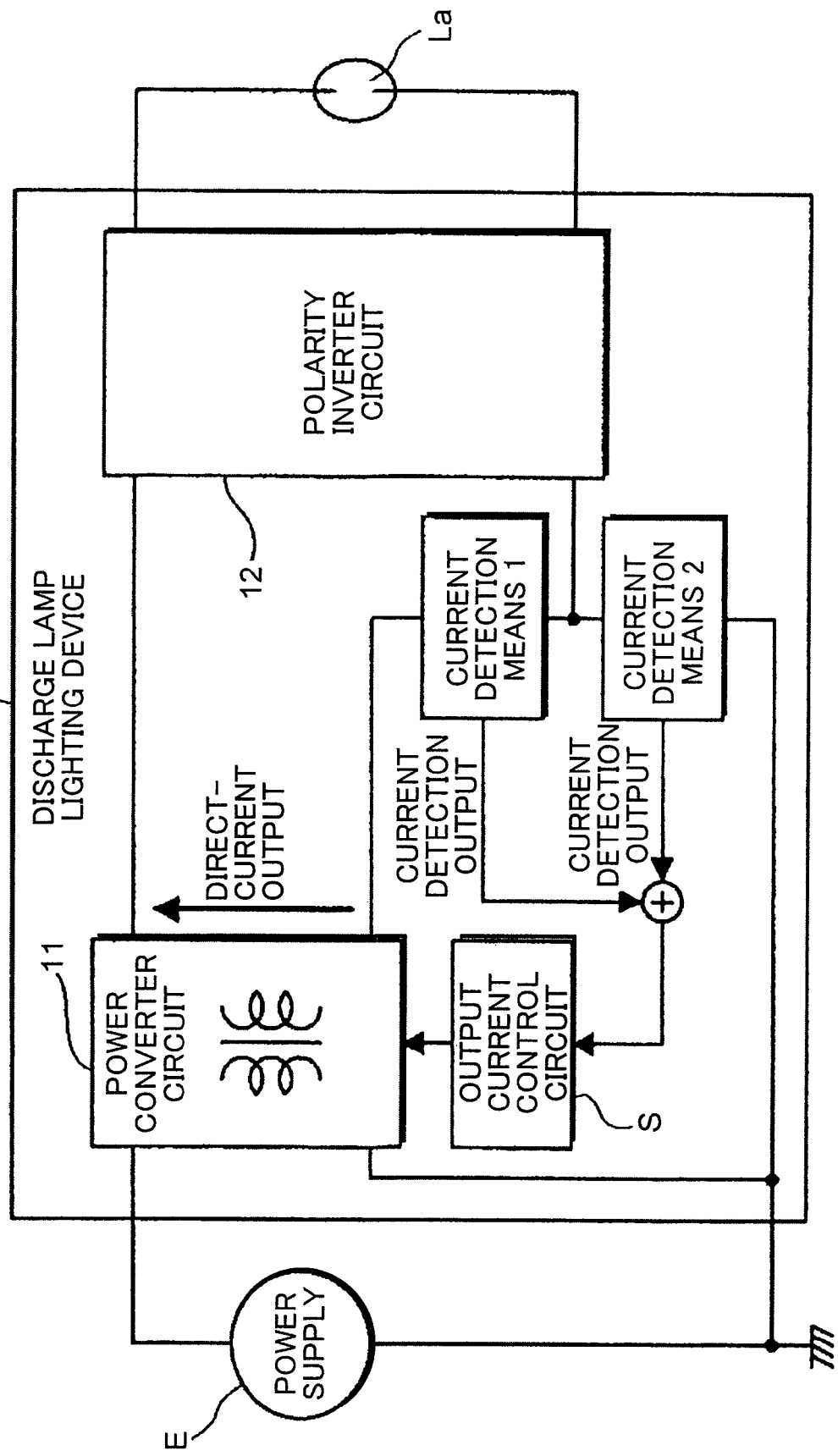
FIG. 1 is a block circuit diagram showing a basic configuration of Embodiment 1 of the present invention.

FIG. 1 is a block diagram showing a basic embodiment of the present invention. A power converter circuit 11 configuring a discharge lamp lighting device 10 has a structure in which a galvanic isolation is obtained between the input side terminal to which a power supply E is connected and the output side terminal by means a transformer or the like. The output terminal of the power converter circuit 11 is provided with current detection means 1 and current detection means 2 as output detection means. The output of the power converter circuit 11 is regulated by an output current control circuit S based on current detection outputs of these current detection means 1 and 2. Of the output detection means that are provided at the output terminal of the power converter circuit 11, the current detection means 1 for detecting an output current such as a lamp current is provided at one end of the output terminal of the power converter circuit 11.

In the configuration shown in FIG. 1, in addition to a discharge lamp La which is an actual load, circuits downstream of a polarity inverter circuit 12 for alternating the polarity of a voltage applied to the discharge lamp La are load circuits. The load circuits are supplied with a direct-current output that is output from the power converter circuit 11 in which the galvanic insulation is obtained between the input side and the output side. One end of the output of the power converter circuit 11 is connected to one end of the load circuit via the current detection means 1. The other end of the power converter circuit 11 is connected to the other end of the load circuit. Furthermore, the one end of the load circuit is connected to one terminal of the input terminal of the power converter circuit 11 via the current detection means 2. In FIG. 1, the input terminal that is connected to the grounded terminal out of two terminals of the power supply E is connected to the one end of the load circuit via the current detection means 2. However, the connected terminal is not connected exclusively to the grounded terminal or ungrounded terminal of the terminals of the power supply. It is also not connected exclusively to the terminal with high potential or the terminal with low potential. Moreover, the polarity of the output of the power converter circuit 11 is not limited to the illustrated polarity.

The output current control circuit S regulates the output of the power converter circuit 11 such that a detection signal that is obtained by synthesizing the outputs of the currents detected by the current detection means 1 and 2 indicates a predetermined target value. Thus, feedback control is executed such that when the value indicated by the detection signal increases and exceeds the target value, the output of the power converter circuit 11 is reduced, and when, on the other hand, the value indicated by the detection signal decreases to below the target value, the output of the power converter circuit 11 is increased. In a normal state, a current that is supplied to the load circuit is detected by the current detection means 1. The power converter circuit 11 is galvanically insulated from the input side. Therefore, no current is detected by the current detection means 2 because there is no current flowing to the current detection means 2 in the normal state. For this reason, the output is regulated mainly based on the result of the detection performed by the current detection means 1.

A ground fault that occurs at a load terminal of the discharge lamp La leads to the formation of a current pathway that extends from the ground-fault section to the output of the power converter circuit 11 through the grounded terminal of the power supply, the current detection means 2, and the current detection means 1. A ground-fault current flows through this current pathway. Ground-fault detection signals that are detected by the current detection means 1, 2 are synthesized by the additive polarities. Therefore, when a ground fault occurs, the value detected by the current detection means 2 increases, resulting in an increase in the value of the synthesized signal. According to this configuration, the output current control circuit S controls the output of the current converter circuit 11 in accordance with the detection signal (synthesized signal) that is obtained by synthesizing the outputs of the currents detected by the current detection means 1 and 2. In other words, the output of the power converter circuit 11 is regulated by reducing the output of the current converter circuit 11 when the synthesized signal increases, and increasing the output of the current converter circuit 11 when the synthesized signal decreases. Thus, a load current obtained in a ground-fault state can be made lower than the output current obtained in a normal lighting state.

A detection gain of the current detection means 2 is greater than a detection gain of the current detection means 1. Therefore, even when the ground-fault current is small due to a large ground-fault resistance of the ground-fault section, the value of the synthesized output signals of the detected currents become large. Consequently, the output current control circuit S judges that the output from the power converter circuit 11 is large, and can reduce the output of the power converter circuit 11 to further suppress the ground-fault current. By switching the output of the power converter circuit 11 to a predetermined value upon detection of a ground fault in the manner described above, excessively large ground-fault current can be suppressed, preventing damage to the lighting device. Furthermore, because the stress caused by the ground fault can be suppressed, it is not necessary to increase the tolerance capacity of the circuit elements to prevent damage, whereby the cost can be lowered.

Figure 2:
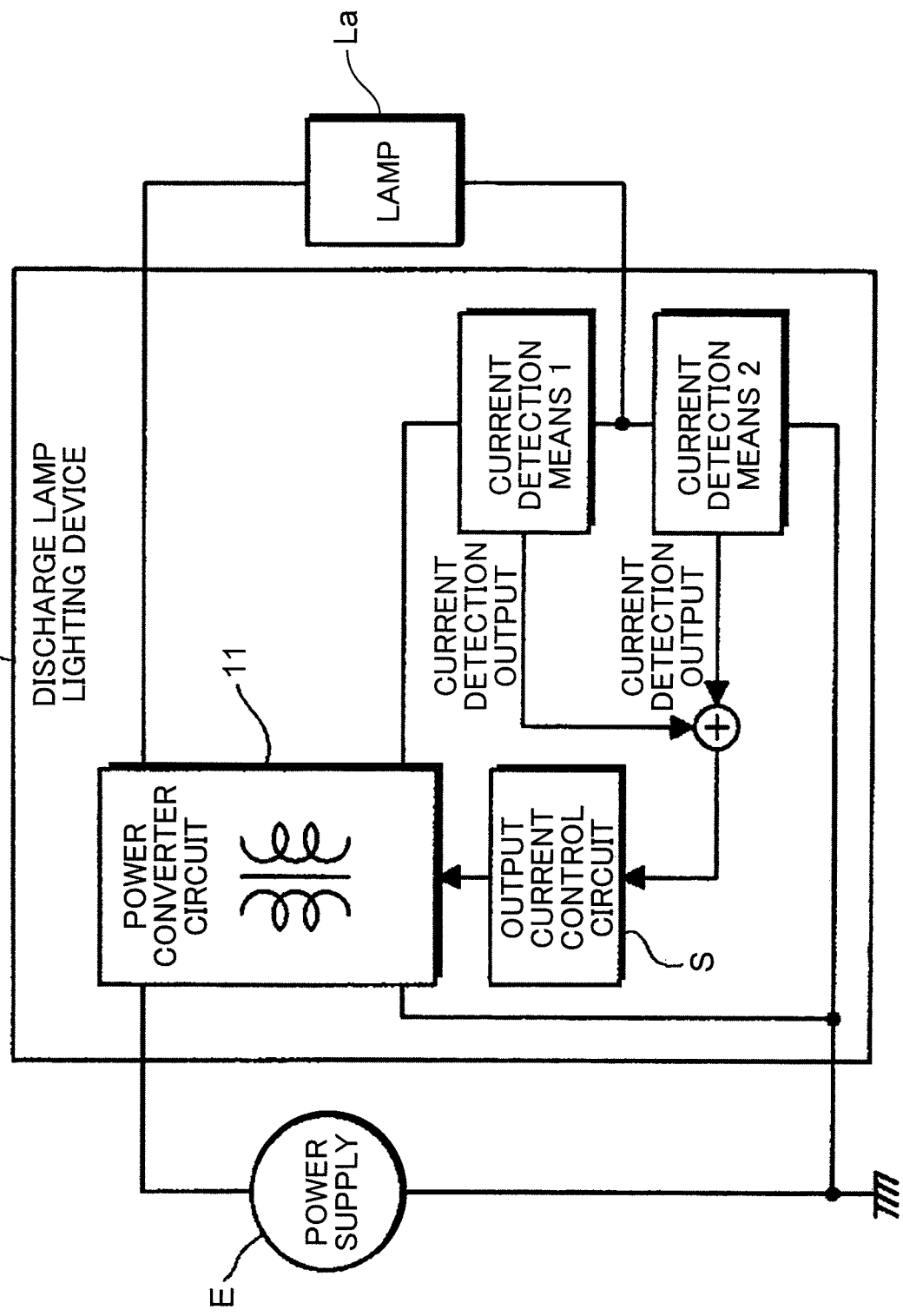
FIG. 2 is a block circuit diagram showing a modification of Embodiment 1 of the present invention.

In FIG. 1, the discharge lamp La is connected to the output of the power converter circuit 11 via the polarity inverter circuit 12, but the inverter circuit 12 is not always necessary. In the example shown in FIG. 2, one end of the output of the power converter circuit 11 is connected to one end of the lamp La, or the load, via the current detection means 1, and the other end of the output of the power converter circuit 11 is connected to the other end of the lamp La. In addition, the one end of the lamp La is connected to one terminal of the input terminal via the current detection means 2. Although FIG. 1 assumes that the output of the power converter circuit 11 is a direct-current output, the output of the power converter circuit 11 in FIG. 2 may not only be a direct-current output but also an alternating-current output. In a normal operation, the output current flows only to the current detection means 1, and at the time of the occurrence of a ground fault, the ground-fault current flows to the both current detection means 1 and 2. The synthesized signal of the outputs thereof may be of additive polarity.

Figure 3:
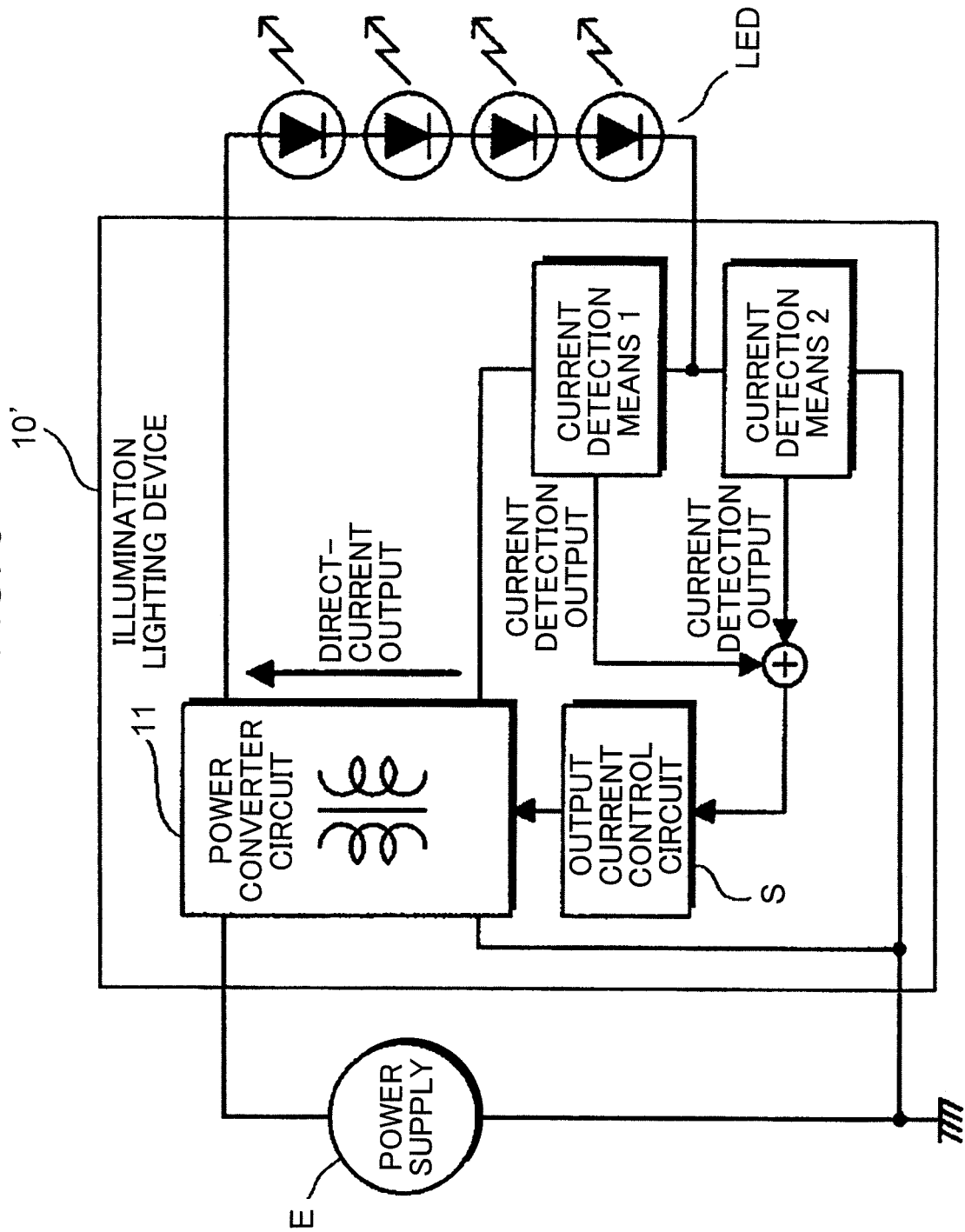
FIG. 3 is a block circuit diagram showing another modification of Embodiment 1 of the present invention.

The lamp that is used as a load is not limited to the discharge lamp. For example, an LED such as an illumination lighting device 10' shown in FIG. 3 may be used as the load of the lamp. In this case, the output of the power converter circuit 11 is a direct-current output.

(Embodiment 2)

Figure 4:
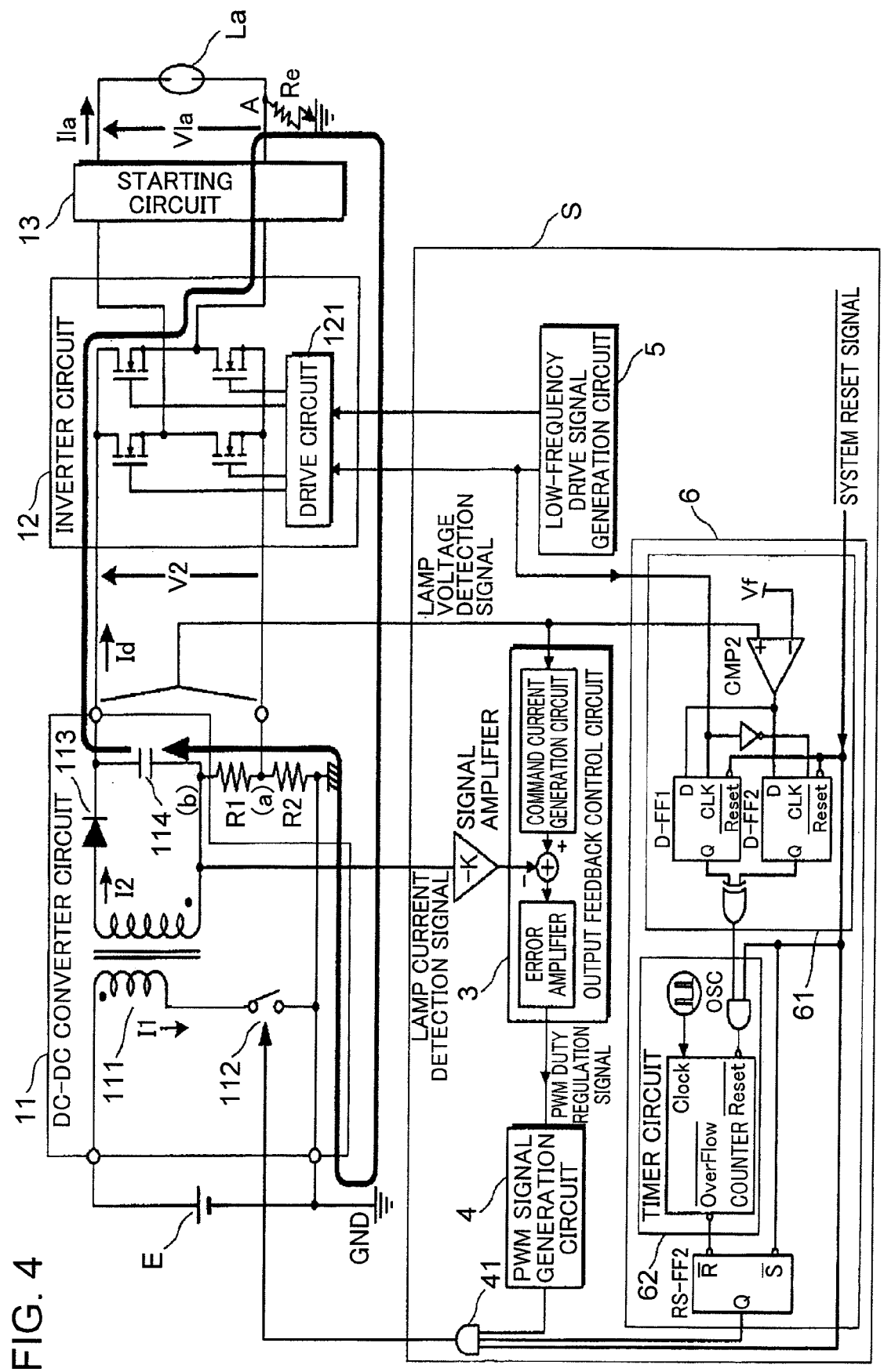
FIG. 4 is a circuit diagram showing a specific circuit configuration of Embodiment 2 of the present invention.

FIG. 4 shows a specific embodiment of the present invention. A DC-DC converter circuit 11 converts the power of a direct-current power supply E into a voltage required by the discharge lamp La. The direct-current output of the DC-DC converter circuit 11 is converted into an alternating voltage by the inverter circuit 12. This converted voltage is supplied to the discharge lamp La. The discharge lamp La is supposedly a high-intensity discharge lamp (HID). Thus, a starting circuit 13 is connected between the output of the inverter circuit 12 and the discharge lamp La. The starting circuit 13 is a circuit that applies a high voltage to the discharge lamp La to start the discharge.

In the DC-DC converter circuit 11 serving as the power converter circuit, a power supply E is connected to a primary winding of a transformer 111 via a switching element 112. The DC-DC converter circuit 11 indicates a switching regulator that has a configuration in which a current 11 from the power supply E is interrupted by the switching element 112 using a high-frequency wave, and a configuration in which a voltage that is stepped up and stepped down by a secondary winding is rectified and smoothed by a diode 113 and condenser 114. However, in a configuration in which the input side and the output side are galvanically insulated, the configuration of the power converter circuit is not limited.

In FIG. 4, the inverter circuit 12 is a square-wave inverter that simply converts the polarity of a voltage supplied to the discharge lamp La. Therefore, the output current or output voltage of the output terminal of the DC-DC converter circuit 11 is detected as a signal that is substantially equivalent to a lamp current Ila or lamp voltage Vla of the discharge lamp La that is the load. Then, based on the detected signal, a PWM regulation signal obtained by an output feedback control circuit 3 regulates a PWM signal for driving the switching element 112 of the DC-DC converter circuit 11. Stable lighting is realized by this output control.

The type of a PWM signal generation circuit 4 is not particularly limited. The PWM signal generation circuit 4 may be a so-called switch-mode type PWM signal generation circuit that regulates a duty by using, as the PWM signal, a result of size comparison between a triangular wave and the PWM regulation signal. The PWM signal generation circuit 4 may also be a so-called current-mode type PWM signal generation circuit that is turned ON in a predetermined cycle and turned OFF when a switching element current based on the PWM regulation signal is reached.

One end of the output of the DC-DC converter circuit 11 (a low-voltage side output terminal in the diagram) is connected to one end of the current sensing resistor R1, and the other end of the resistor R1 is connected to one end of the input of the inverter circuit 12. The one end of the input of the inverter circuit 12 is connected to one end of the current sensing resistor R2, and the other end of the resistor R2 is connected to the one end of the input (the grounded-side connected terminal of the power supply E in the diagram).

The output current is detected by detecting a voltage between both ends of the series circuit of the resistors R1, R2. In an output control circuit S shown in FIG. 4, a circuit ground (GND) is used as a reference and the circuit ground servers as the other end of the resistor R2. Thus, the voltage between both ends of the series circuit of the resistors R1, R2 can be detected by detecting the voltage of the one end of the resistor R1.

When the discharge lamp La is lit normally, an output current Id from the DC-DC converter circuit 11 to the inverter circuit 12 flows only to the current sensing resistor R1 in a polarity from a point (a) to a point (b) as shown in the diagram. The DC-DC converter circuit 11 is configured such that the input side and the output side are galvanically insulated. Therefore, because no current flows to the current sensing resistor R2, the voltage drop at the resistor R2 is zero. Accordingly, the potential of the one end (the point (a)) of the resistor R2 reaches the level of the circuit ground (GND) and consequently the voltage of the one end (the point (b)) of the resistor R1 becomes equal to the voltage drop of the resistor R1. In other words, the voltage defined by the output current Id and the resistance value of the resistor R1 becomes a lamp current detection signal.

Amplification for computing the error between this lamp current detection signal and a command current value that is obtained from a lamp voltage detection signal corresponding to the lamp voltage generates the PWM regulation signal. The PWM regulation signal regulates the output by controlling ON/OFF signals of the switching element 112.

When the polarity of the output of the DC-DC converter circuit 11 is as shown in FIG. 4, the level of the detection signal at the point (b) becomes lower than the level of the circuit ground (GND) and thus becomes a negative potential. Therefore, the lamp current detection signal is inverted by a signal amplifier in the illustrated configuration (a gain (-K) is negatively displayed), but this inversion is not essential when the output feedback control circuit 3 is configured to be able to input positive and negative potentials.

As shown in FIG. 4, when a ground fault occurs at an output terminal (a point A) of the discharge lamp lighting device, the ground-fault current flows as shown by the thick arrow. At this moment, the ground-fault current flows to the current sensing resistor R1 with the same polarity as that of the output current obtained during the normal operation time. The ground-fault current flows to the current sensing resistor R2 with the polarity from the other end, or the circuit ground (GND) side to the (a) point. The potential of the point (a) decreases and becomes lower than the circuit ground (GND) level by the reduced amount of the voltage of the resistor R2 resulting from the ground-fault current. The potential of the point (b) decreases and becomes lower than the potential of the point (a) by the reduced amount of the voltage of the resistor R1 resulting from the ground-fault current. Specifically, at the time of the occurrence of the ground fault, the detection signals of the current sensing resistors R1, R2 are synthesized with the additive polarities at the point (b). The detected resistors become larger than those during the normal operation time (resistor R1+resistor R2). The output feedback control circuit 3 judges that the output current is large, and performs the operation to reduce the output, whereby the ground-fault current is reduced. As a result, damage to the circuit caused by the ground-fault current can be prevented.

Figure 5:
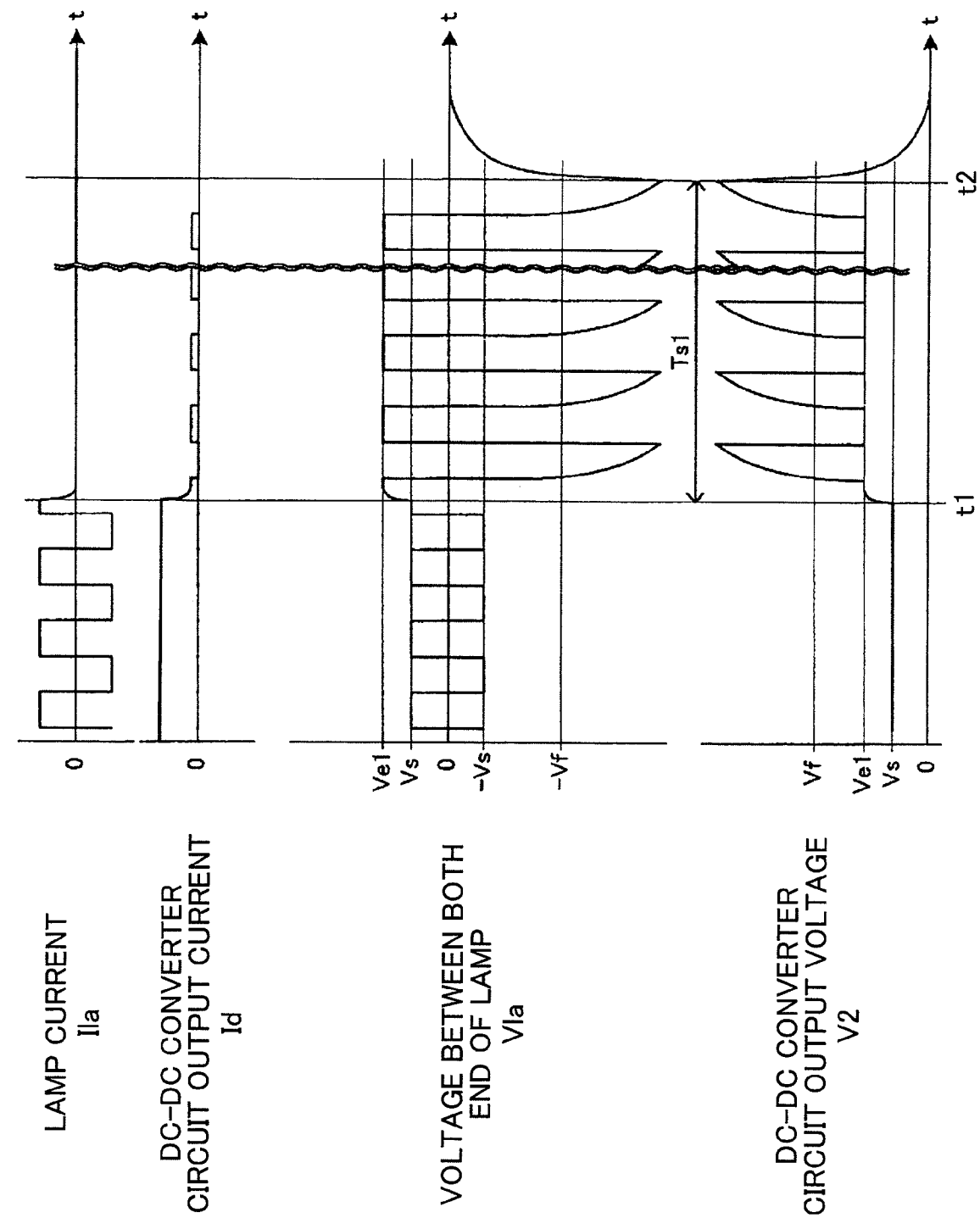
FIG. 5 is an operation waveform diagram of Embodiment 2 of the present invention.

In the embodiment shown in FIG. 4, additional ground fault protective means used by a ground fault failure protection circuit 6 is provided. FIG. 5 shows operation waveforms that are obtained when a ground fault occurs at one end of the discharge lamp La. A ground fault occurs at a time point t1 shown in FIG. 5. After a lapse of determination time period Ts1, the ground fault is determined and a protective operation is carried out at a time point t2. In the case of a discharge lamp load, the flow of the ground fault suppresses the output. As a result, the discharge lamp is turned off. Even when the discharge lamp is not turned off at the time of the occurrence of the ground fault, inverting the output polarities while suppressing the output cannot increase the output drastically, whereby the discharge lamp is turned off.

When the inverter circuit 12 inverts the output polarities, the polarity where the ground fault occurs (the point A in FIG. 4) becomes equal to the level of the circuit ground (GND), and the ground-fault current no longer flows. Because the discharge lamp is turned off, the output of the DC-DC converter circuit 11 enters a no-load state. Therefore, an output voltage V2 of the DC-DC converter circuit 11 increases an upper limit voltage Vov that is set as a no-load open voltage, to the maximum. When the output polarities are further inverted and the voltage of the ground-fault side polarity (the point A in FIG. 4) increases, the ground-fault current flows again. At this moment, the output voltage V2 of the DC-DC converter circuit 11 becomes an output voltage Ve1 corresponding to a ground-fault resistor Re. Thus, as shown in FIG. 5, the output voltage V2 of the DC-DC converter circuit 11 alternately becomes the output voltage Ve1 corresponding to the ground-fault resistor Re when the ground fault occurs, and increases in a voltage equal to or higher than a turn-off determination voltage Vf caused by the no-load state, every time the polarities are inverted by the inverter circuit 12. As a result, a large pulse waveform is formed. In other words, when either one of the polarities of the outputs to the inverter circuit 12 becomes equal to or greater than the turn-off determination voltage Vf, the possibility of a ground fault can be determined. The turn-off determination voltage Vf indicates a voltage at which it can be determined that the discharge lamp is off and is therefore in the no-load state.

Note that when the discharge lamp is the load, an output voltage polarity obtained during its half-wave discharge state forms an output voltage waveform shown in FIG. 5. Therefore, normally, even when the time period Ts1 during which the half-wave discharge is supposedly canceled in a normal discharge lamp is exceeded, it is determined that a ground fault is generated as long as one of the polarities of the outputs constantly exceeds the turn-off determination voltage Vf. When it is determined that a ground fault is generated, the output of the DC-DC converter circuit 11 is stopped as shown by the time point t2 in FIG. 5, so that safe protection can be performed. The determination time period Ts1 is generally one minute or less.

When the half-wave state is detected by an output half-wave detection circuit 61, the ground fault failure protection circuit 6 shown in FIG. 4 uses a timer circuit 62 to measure the time period in which the half-wave state continues, and outputs a protective signal when the determination time period Ts1 is exceeded. The output half-wave detection circuit 61 uses a comparator CMP 2 to determine whether the output voltage of the DC-DC converter circuit 11 exceeds the turn-off determination voltage Vf or not, and keeps the determination results corresponding to the polarities in latch circuits D-FF1 and D-FF2, respectively. The timing at which the latch circuits D-FF1 and D-FF2 latch a determination output of the comparator CMP2 is immediately before the polarities are inverted. Thus, the latch circuits D-FF1 and D-FF2 are operated at the timing of the rising and the falling of a polarity inversion command signal that is issued by a low-frequency drive signal generation circuit 5 for outputting a polarity inversion command from the inverter circuit 12. Each of the latch circuits D-FF1 and D-FF2 stores the result of the determination on whether the output voltage obtained immediately before the inversion of each polarity exceeds the turn-off determination voltage Vf or not. When an exclusive OR of the outputs of the latch circuits D-FF1 and D-FF2 reaches an H level, it is determined that the output voltage of the DC-DC converter circuit 11 is in the no-load state at one polarity side, and a counter configuring the timer circuit 62 is operated. When the predetermined set value Ts1 is exceeded, the counter resets a latch circuit RS-FF 2 by outputting an overflow signal. In this manner, the output of the PWM signal is stopped at an AND gate 41 to stop the output of the DC-DC converter circuit 11, whereby the discharge lamp lighting device is protected from the ground fault.

In the case of a ground fault at the ground-fault point (the point A in FIG. 4) having a certain ground-fault resistance Re, the ground-fault current thereof decreases. In this case as well, the detection gain is increased by setting the resistance value of the resistor R2 high, in order to securely detect the ground fault. In this manner, the ground fault is detected securely by reducing the output current and the ground-fault current itself and securely turning the discharge lamp off.

In order to securely detect the ground fault and to turn the discharge lamp off at the time of the occurrence of the ground fault, it is desired that the resistance value of the resistor R2 be $R2 \geq R1 \cdot \{(Ila\_min/Ie\_min)-1\}$, wherein Ie_min is the minimum ground-fault current for protecting the discharge lamp lighting device from the ground fault, the minimum ground-fault current being estimated from the minimum value of the lamp voltage obtained during a normal lighting state and the maximum value estimated by a ground-fault resistance, and wherein Ila_min is the minimum current required for keeping the discharge lamp lit.

In the case of the high-intensity discharge lamp (HID lamp), normally the discharge lamp is turned off with ⅓ to ¼ of the lamp current used when the discharge lamp is lit steadily. Thus, the resistor R2 is preferably set at least approximately three times greater than the resistor R1.

In the embodiment shown in FIG. 4, means for determining the output voltage obtained immediately before the polarity inversion is used as the means for determining whether the discharge lamp is off. However, any means can be used as long as it can determine whether the voltage of each polarity exceeds the turn-off determination voltage or not. For example, a sample/hold circuit may be used for holding the output of each polarity. When a low-pass filter that has a cutoff cycle longer than a polarity inversion cycle of the inverter circuit 12 is used, and when the output thereof exceeds Vf/2, it may be determined that at least one of the polarities is turned off. Furthermore, the lamp voltage may be detected at the output terminal of the inverter circuit 12.

Not the output voltage but the turn-off may be determined using the output current. For instance, when the ground fault turns the discharge lamp off, the polarity that is not a ground-fault polarity enters the no-load state and thereby no current is detected. In this manner, it can be determined that the discharge lamp is off. Also, when the ground fault turns the discharge lamp off, the polarity that is not the ground-fault polarity enters the no-load state and the output voltage increases. Consequently, when the polarity changes to the ground-fault polarity as a result of the polarity inversion, a relatively large pulsating current flows drastically. When this pulsating current continues for a predetermined period of time, it is determined that the ground fault occurs.

Moreover, such a determination may be made based on the above-mentioned output voltage and output current in order to increase the certainty of the ground fault determination. The ground fault failure protection circuit 6 may be used along with a half-wave discharge stop function when the discharge lamp reaches the end of its life.

(Embodiment 3)

Figure 6:
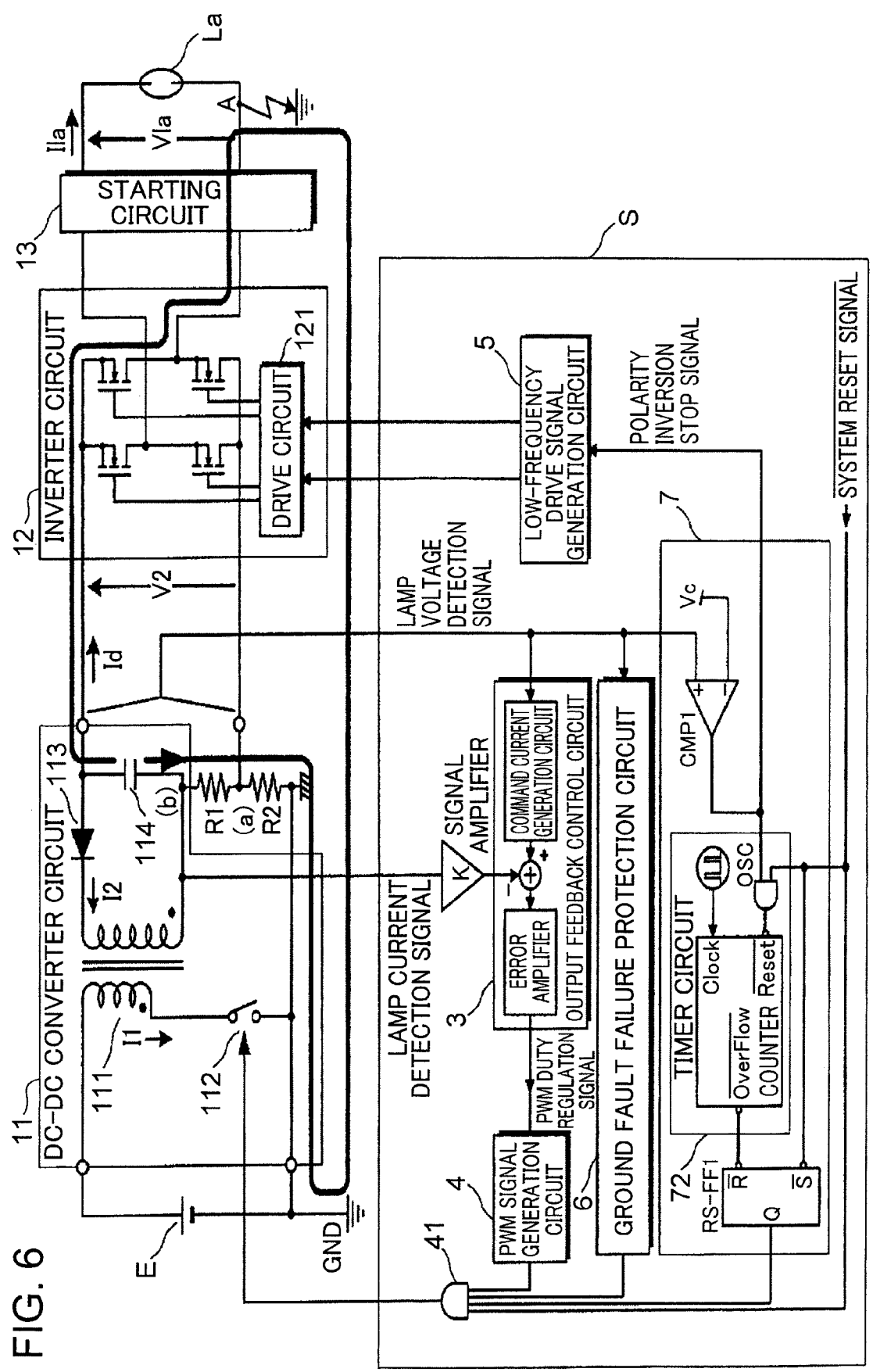
FIG. 6 is a circuit diagram showing a specific circuit configuration of Embodiment 3 of the present invention.

A third embodiment is shown in FIG. 6. The main circuit configuration shown in FIG. 6 is the same as that of the embodiment shown in FIG. 4. The difference with the one shown in FIG. 4 is that, compared to the one end of the output terminal of the DC-DC converter circuit 11 that is connected to the current sensing resistor R1, the other end has a negative potential output with a low potential. However, the purposes of the present invention are the same. When the output potential of the DC-DC converter circuit 11 changes, the polarities of the currents flowing through the output current sensing resistors R1 and R2 are inverted from those shown in the embodiment of FIG. 4, and consequently the polarities of the detection signals are also naturally inverted. However, the operations remain the same.

More specifically, a current flows only to the resistor R1 when the discharge lamp is normally lit, and the potential at the point (a) becomes equal to the potential of the circuit ground (GND). The potential at the point (b) increases by a voltage drop of the resistor R1, which is caused by the output current. This potential is utilized as the lamp current detection signal in order to perform output control.

When the ground fault occurs, the ground-fault current flows as shown by the thick arrow. The potential at the point (a) increases by a voltage drop of the resistor R2, which is caused by the ground-fault current. The ground-fault current of the same polarity as that obtained when the discharge lamp is lit normally flows to the resistor R1. Thus, the potential at the point (b) becomes higher than the potential of the point (a) by the voltage drop of the resistor R1. Consequently, since the lamp current detection signal becomes larger than normal, the output feedback control circuit 3 performs the operation to suppress the output.

In addition to the ground fault failure protection circuit 6 shown in FIG. 4, a ground fault protection circuit 7 is provided in the embodiment shown in FIG. 6. The ground fault failure protection circuit 6 shown in FIG. 4 adopts a technique of determining that a ground fault is likely to occur when the state of the output voltage of the inverter circuit 12 is in the no-load state at one polarity side, and then stops the output of the DC-DC converter circuit 11 when the duration of this state reaches the predetermined time period Ts1.

When a ground fault occurs while the ground-fault resistance is minimal, the discharge lamp is turned off as with the case of the embodiment shown in FIG. 4. Inverting the output polarities increases the output voltage V2 to above the turn-off determination voltage, and further inverting the polarities discharges a charge of the high voltage accumulated in the smoothing condenser 114 of the DC-DC converter circuit 11, through the ground-fault point. When the ground-fault resistance is large, the discharge current can be suppressed to some extent. When the ground-fault resistance is minimal, the discharge current becomes extremely large, and hence the stress on the circuit.

For these reasons, in the embodiment shown in FIG. 6, upon occurrence of the ground fault, the ground fault protection circuit 7 is caused to stop the polarity inversion operation while the polarity has the ground fault. Suppose that the ground fault occurs at a time point t3 when the ground-fault resistance is minimal, as shown by the waveforms in FIG. 8. The ground-fault current is suppressed by the synthesized signal of the sensing resistors R1 and R2, and the output voltage decreases due to the lowered ground-fault resistance. The comparator CMP1 is caused to determine that the level of the output voltage V2 becomes lower than a predetermined voltage Vc in terms of absolute values, whereby a polarity inversion stop signal is provided to the low-frequency drive signal generation circuit 5 that outputs the polarity inversion command of the inverter circuit 12, and the polarity inversion operation on a low-frequency drive signal is stopped. At the same time, a counter configuring a timer circuit 72 is operated. When a predetermined set value Ts2 is exceeded, the counter resets a latch circuit RS-FF 1 by outputting an overflow signal. In this manner, the output of the PWM signal is stopped at the AND gate 41 to stop the output of the DC-DC converter circuit 11, whereby the discharge lamp lighting device is protected from the ground fault. In the present embodiment, the ground-fault state is maintained by stopping the polarity inversion operation on the ground-fault polarity side, so as to detect the ground fault easily and to prevent the occurrence of an excessive current that is generated immediately after the output polarity is inverted after the output voltage increases in the polarity that has no ground fault.

The polarity inversion operation is stopped after a lapse of the predetermined determination time period Ts2 since the output voltage V2 becomes equal to or lower than the predetermined voltage Vc in terms of absolute values. This is because the operation needs to be prevented from being stopped erroneously, since the lamp voltage Vla is extremely low immediately after the discharge lamp starts discharging while it is cooled. The determination time period Ts2 is generally one second or less.

Note that the predetermined voltage Vc at a voltage detection level may be the same as the level of a output short-circuit determination voltage and used along with an output short-circuit protection stop function.

Figure 7:
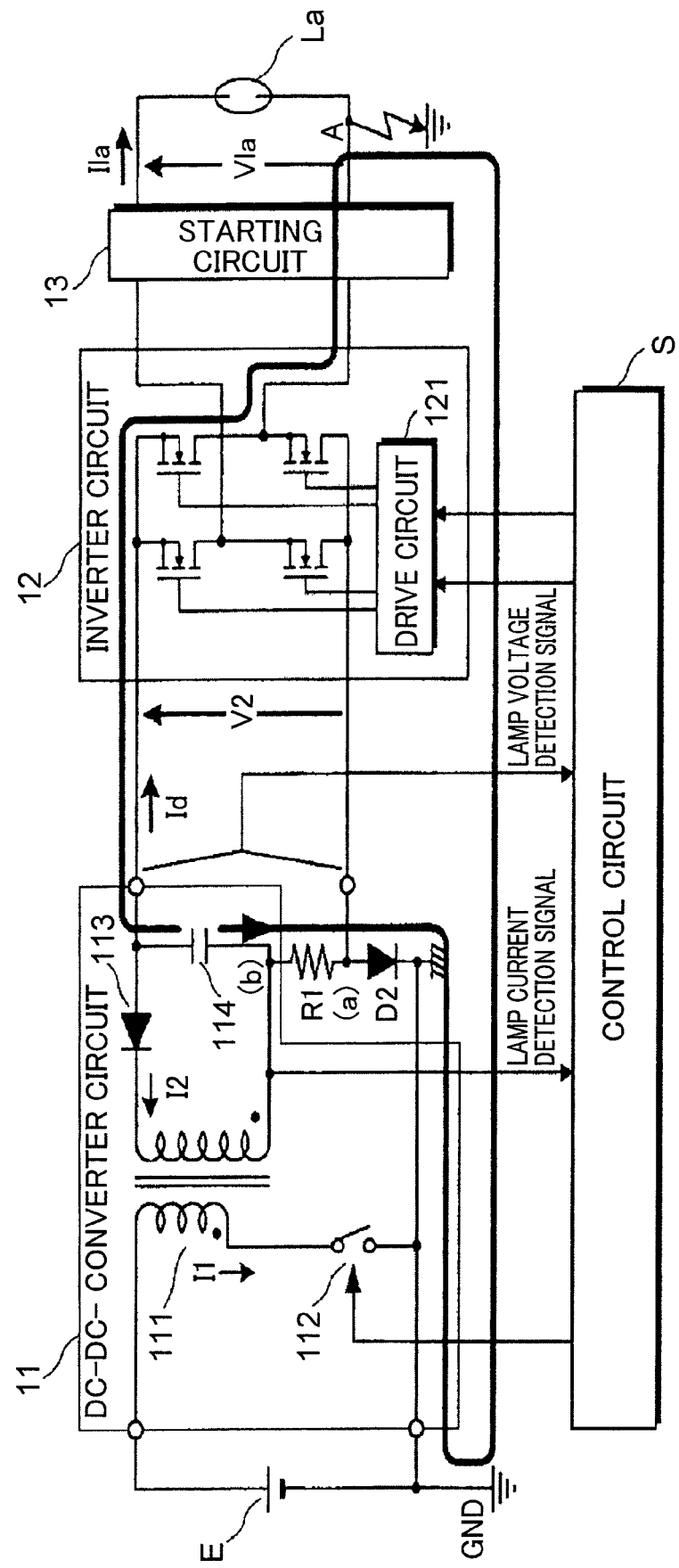
FIG. 7 is a circuit diagram showing a modification of Embodiment 3 of the present invention.

Moreover, other impedances may be used in place of the ground-fault current sensing resistor R2. For example, FIG. 7 illustrates an embodiment that uses a diode D2 in place of the resistor R2. In this case, the diode D2 is connected with a polarity which does not block the ground-fault current. When the ground-fault current flows, the voltage corresponding to the voltage drop of the resistor R1 caused by the ground-fault current and a forward voltage of the diode D2 are superimposed with the additive polarity to produce a signal, and thus obtained signal is detected as an output current detection signal from the point (b), whereby the ground-fault current is suppressed.

As a result, the potential at the point (a) becomes equal to or lower than the forward voltage of the diode D2 at most, with respect to the circuit ground (GND). Thus, the potential at the point (a) in the current detection part and the potential at the point (b) in the current signal detection point can be prevented from being excessively large from the moment when a ground fault occurs while the output voltage is high. In this manner, the generation of stress on the detection circuit and other control circuits can be prevented.

The resistors may be connected in parallel to the diode D2 to achieve a configuration that is stable in terms of the potentials, so that the potential at the point (a) can be prevented from inadvertently floating (being insulated) from the circuit ground (GND).

The protective method according to the present embodiment is not affected by the output potential of the DC-DC converter circuit 11 and therefore can be applied to the case shown in FIG. 4.

(Embodiment 4)

The embodiments shown in FIGS. 4 and 6 realize the protective control using hardware. However, the protective control may be realized by using a microcomputer 8 in the output control circuit S and incorporating a ground-fault protective control software of the present invention in part of the control software of the microcomputer 8, as shown in FIG. 9.

Figure 9:
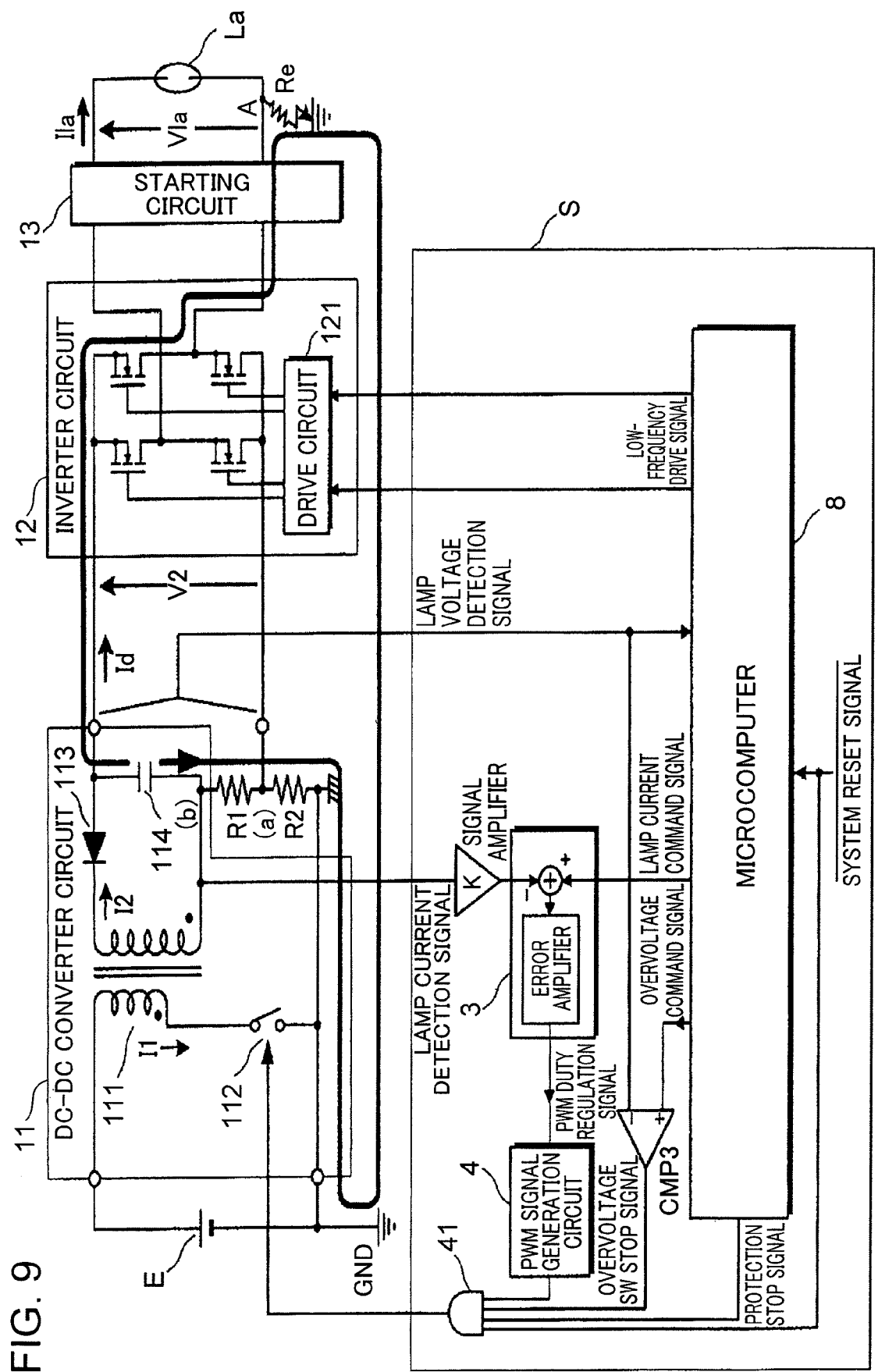
FIG. 9 is a circuit diagram showing a specific circuit configuration of Embodiment 4 of the present invention.

The output control circuit S shown in FIG. 9 also has the following functions. The output voltage signal of the DC-DC converter circuit 11 is detected, and, when a comparator CMP 3 determines that the output voltage exceeds an overvoltage command signal voltage, the comparator CMP 3 outputs an overvoltage switching stop signal. As a result, the PWM signal is stopped at the AND gate 41, whereby the output voltage is controlled to no longer increase.

This function is not illustrated but provided in the output control circuits S shown in FIGS. 4 and 6 as well. The overvoltage command signal voltage is normally set at the upper limit voltage Vov of the no-load open voltage. This voltage is set to be several to several tens of times more (e.g., 400V) than the lamp voltage when the discharge lamp is on (e.g., 85V or 40V), in order to allow the discharge lamp to start discharging easily when the discharge lamp is off immediately after the operation of the discharge lamp lighting device is started.

Thus, when the ground fault protective operation shown in FIG. 5 is carried out by the ground fault protective means shown in FIG. 4, the voltage of the output polarity that enters the no-load state increases to Vov at the most. In actuality, the characteristics of the increase of the voltage of the no-load polarity are the characteristics shown in FIG. 5 due to the output capacity of the DC-DC converter circuit 11. Furthermore, the voltage obtained when inverting the no-load polarity to the ground-fault polarity is determined based on an inverter frequency. In order to suppress the stress on the circuit, it is preferred that the output voltage obtained when inverting the no-load polarity to the ground-fault polarity be low. Here, when starting the discharge lamp, control for setting the overvoltage command signal voltage at the upper limit voltage Vov of the no-load open voltage in order to facilitate the start of the discharge lamp is performed, and control for switching the overvoltage command signal voltage to a voltage lower than the Vov is performed upon occurrence of a ground fault.

Figure 10:
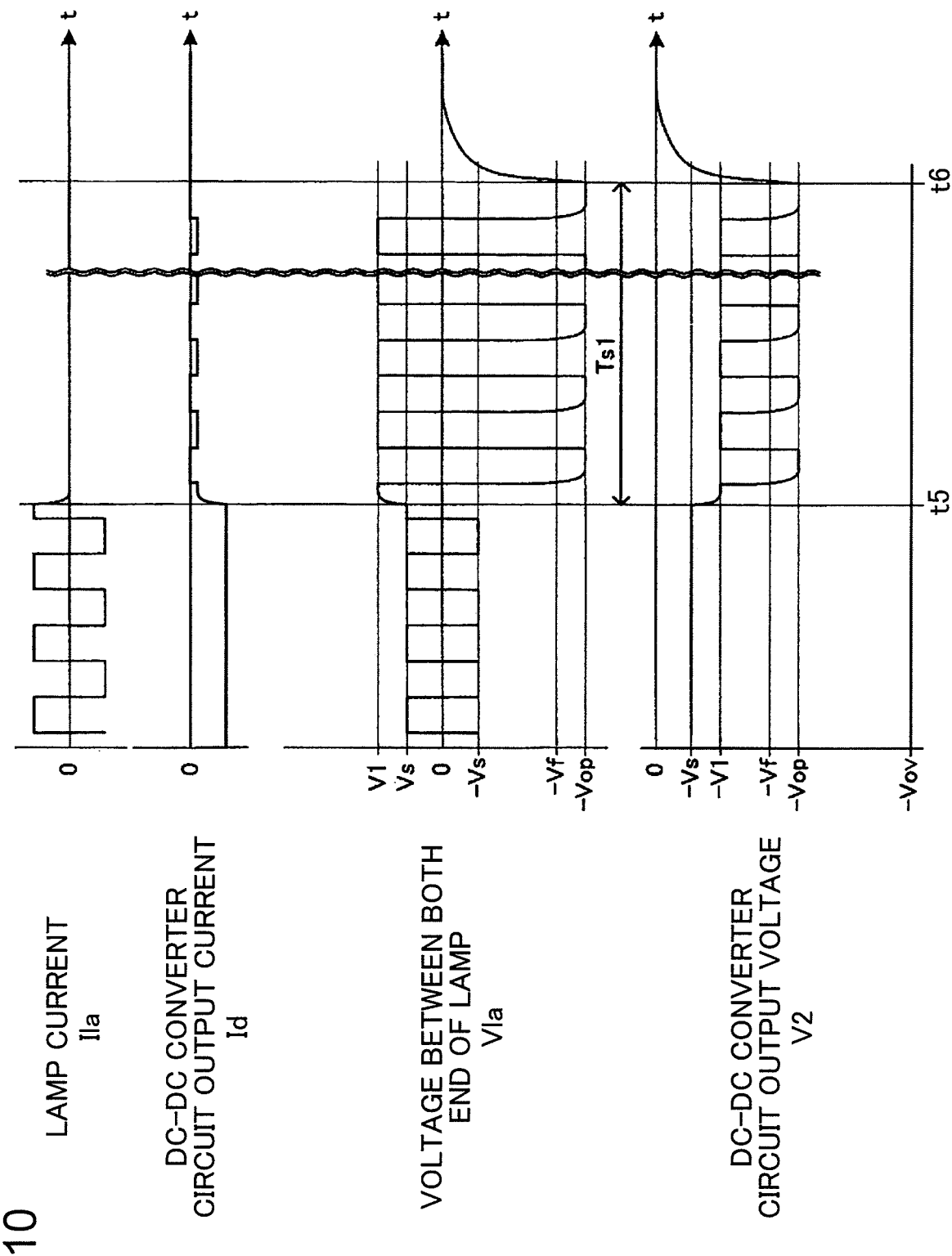
FIG. 10 is an operation waveform diagram of Embodiment 4 of the present invention.

More specifically, after the discharge lamp is turned on, the overvoltage command signal voltage is set to a Vop that is lower than the Vov in terms of absolute values, as shown in FIG. 10. However, in order to determine the turn-off state, the Vop is set at a voltage exceeding the turn-off determination voltage Vf in terms of absolute values. As a result, when a ground fault occurs while the discharge lamp is on, the voltage of the no-load polarity can be prevented from increasing more than necessary, so that the stress caused upon occurrence of the ground fault can be prevented.

Figure 11:
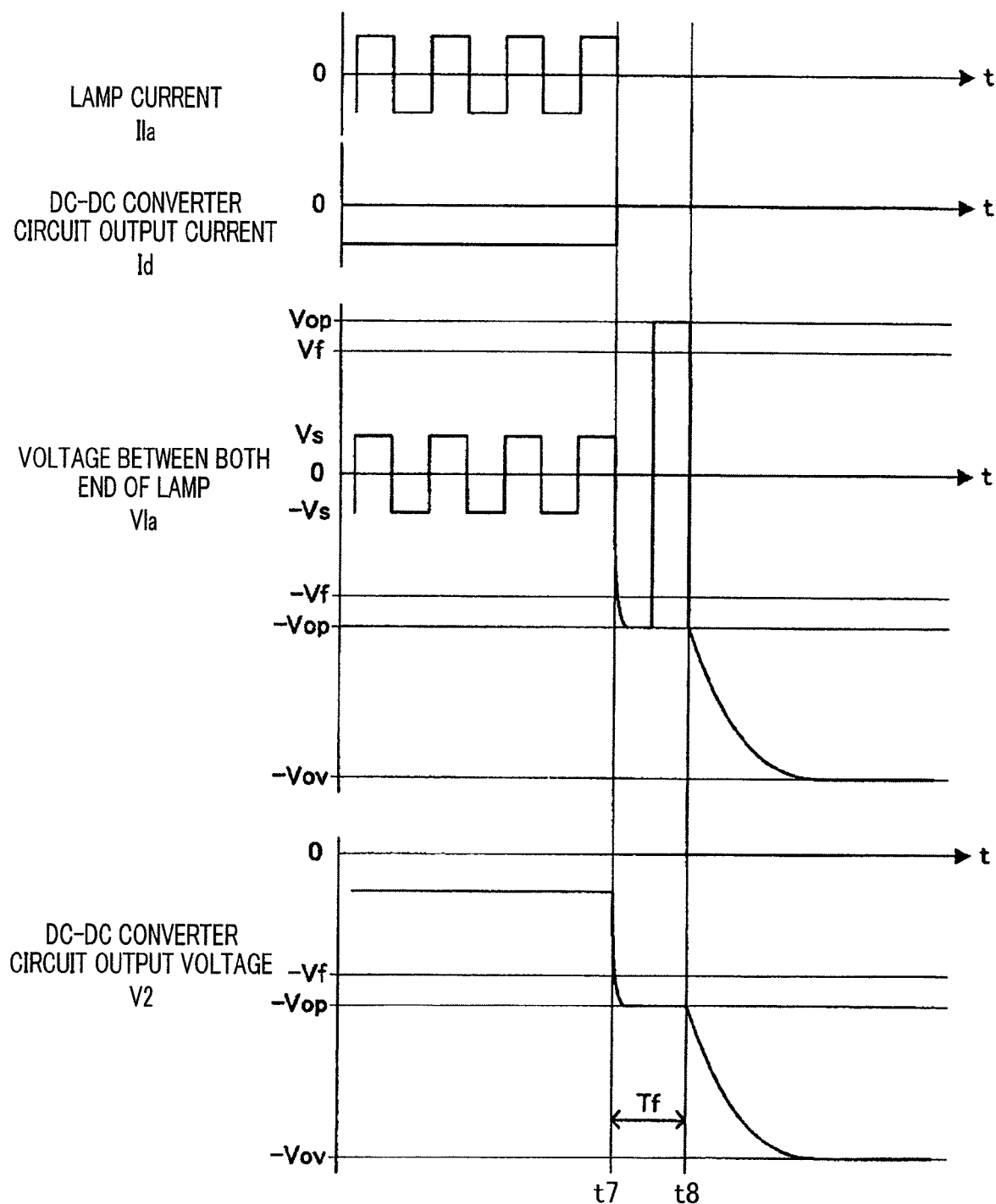
FIG. 11 is an operation waveform diagram of Embodiment 4 of the present invention.

If for any reason the discharge lamp fails and is then caused to start discharging (for a reason of vibration or power supply voltage fluctuation, etc.), then the Vop level is too low for the output voltage. Therefore, the discharge lamp cannot be started. The output voltage is switched to the upper limit command (upper limit voltage) Vov after confirming that the cause of the failure of the discharge lamp is not the ground fault. In other words, it is determined that the both output polarities of the inverter circuit 12 are in the no-load state, if the output voltage (absolute value) is equal to or greater than the turn-off determination voltage Vf (absolute value) on an output cycle Tf or longer in at least the inverter circuit 12 after the output voltage exceeds the turn-off determination voltage Vf in terms of absolute values, after the discharge lamp is turned off at a time point t7, as shown in FIG. 11. It is therefore determined that a ground fault did not occur and that the discharge lamp has failed. Accordingly, at a time point t8, the overvoltage command signal voltage is switched to the upper limit command Vov of the no-load open voltage obtained when the discharge is started.

The failure determination method is not limited to the one described above. When the output voltage on one cycle exceeds the turn-off determination voltage Vf, it is determined that the discharge lamp has failed, and then the overvoltage command signal voltage may be switched. A voltage that is obtained immediately before inverting the output polarities of the inverter circuit 12, or any other voltages that can be referenced to determine the state of the voltage on one cycle as the no-load state, may be used as the output voltage. The output voltage may also be obtained using the detected output current.

When the operation of the discharge lamp lighting device is started in the beginning by applying power thereto, the time period between the start of the operation and when the discharge lamp starts discharging can be reduced by initially setting the overvoltage command signal voltage at the upper limit voltage Vov of the no-load open voltage that is obtained when the discharge lamp starts discharging.

Figure 12:
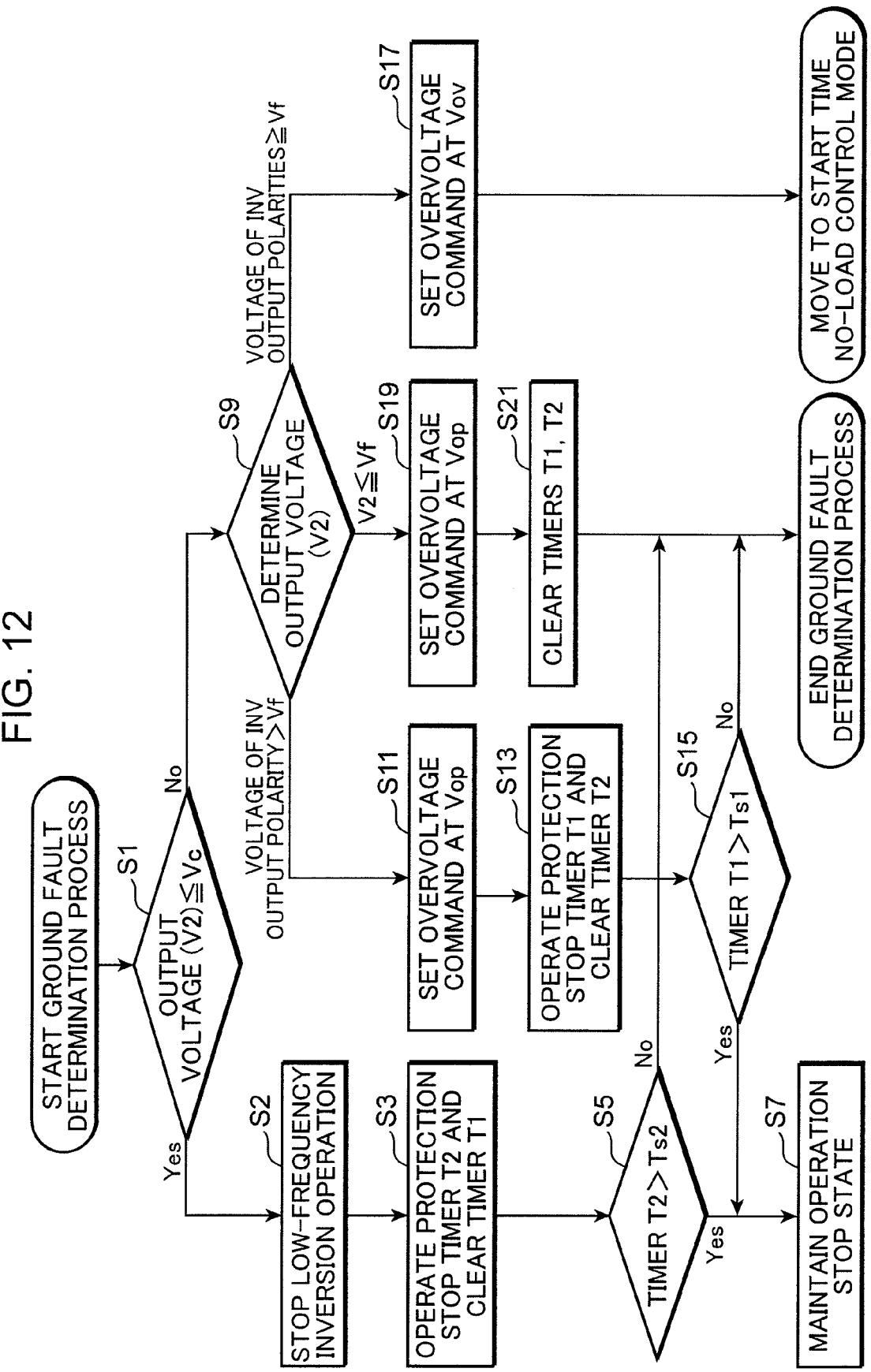
FIG. 12 is a flowchart for illustrating the operations of Embodiment 4 of the present invention.

FIG. 12 is an example of a flowchart of a process for realizing the protective control according to the present embodiment. Control performed by the microcomputer or the like repeatedly performs a series of processing routines in the form of a loop, but the protective control according to the present embodiment can be realized by incorporating the process into the loop.

First, it is confirmed whether the output voltage (V2) is equal to or lower than the output short-circuit determination voltage Vc in terms of absolute values (step S1). When the condition is satisfied (Yes in step S1, FIG. 8), the inversion of the inverter circuit 12 is stopped (step S2), a protection stop timer T2 (the timer circuit 72 shown in FIG. 6) is operated, and a protection stop timer T1 (the timer circuit 62 shown in FIG. 4) is stopped, to accomplish a clear state (step S3). When a time period measured by the timer T2 exceeds a protection stop determination time period Ts2 (Yes in step S5), the operation of the lighting device is stopped, and the stopped state thereof is maintained (step S7). In this manner, the lighting device is protected from a ground fault. When the time period measured by the timer T2 is equal to or shorter than the Ts2 (No in step S5), the ground fault determination process is ended, and the rest or the processing loop is continued.

When the output voltage (V2) is greater than the output short-circuit determination voltage Vc (No in step S1), a determination is made on the output voltage (V2) (step S9). When the output voltage of one of the polarities of the inverter output exceeds the turn-off determination voltage Vf, the overvoltage command is set at the Vop (step S11), the protection stop timer T1 is operated, and the protection stop timer T2 is stopped, to accomplish the clear state (step S13). When a time period measured by the timer T1 exceeds the protection stop determination time period Ts1 (Yes in step S15), the operation of the lighting device is stopped, and the stopped state thereof is maintained (step S7). When the time period measured by the timer T1 is equal to or shorter than the Ts1 (No in step S15), the ground fault determination process is ended, and the rest or the processing loop is continued.

When the output voltage (V2) of each of the both polarities of the inverter output exceeds the turn-off determination voltage Vf, the overvoltage command is set at the Vov (step S17), and the processing is switched to a start time no-load control mode.

When the output voltage (V2) exceeds the output short-circuit determination voltage Vc but is equal to or lower than the turn-off determination voltage Vf, it is determined that the discharge lamp is in the normal state and the overvoltage command is set at the Vop (step S19). Then, the protection stop timers T1 and T2 are stopped to accomplish the clear state (step S21), and the rest of the processing loop is continued.

The flowchart of the process for realizing the protective control according to the present embodiment is not limited the one shown in FIG. 12 and may be any process for realizing the similar concept.

The function for switching between the overvoltage command Vop and the Vov is not limited to the switching control performed by the software but may be realized by hardware.

Note that the present invention is not limited to the illustrated circuits, and any system that realizes the same concept may be used. In addition, the similar control may be realized by a numerical processing function of the microcomputer or the like.

(Embodiment 5)

Figure 13:
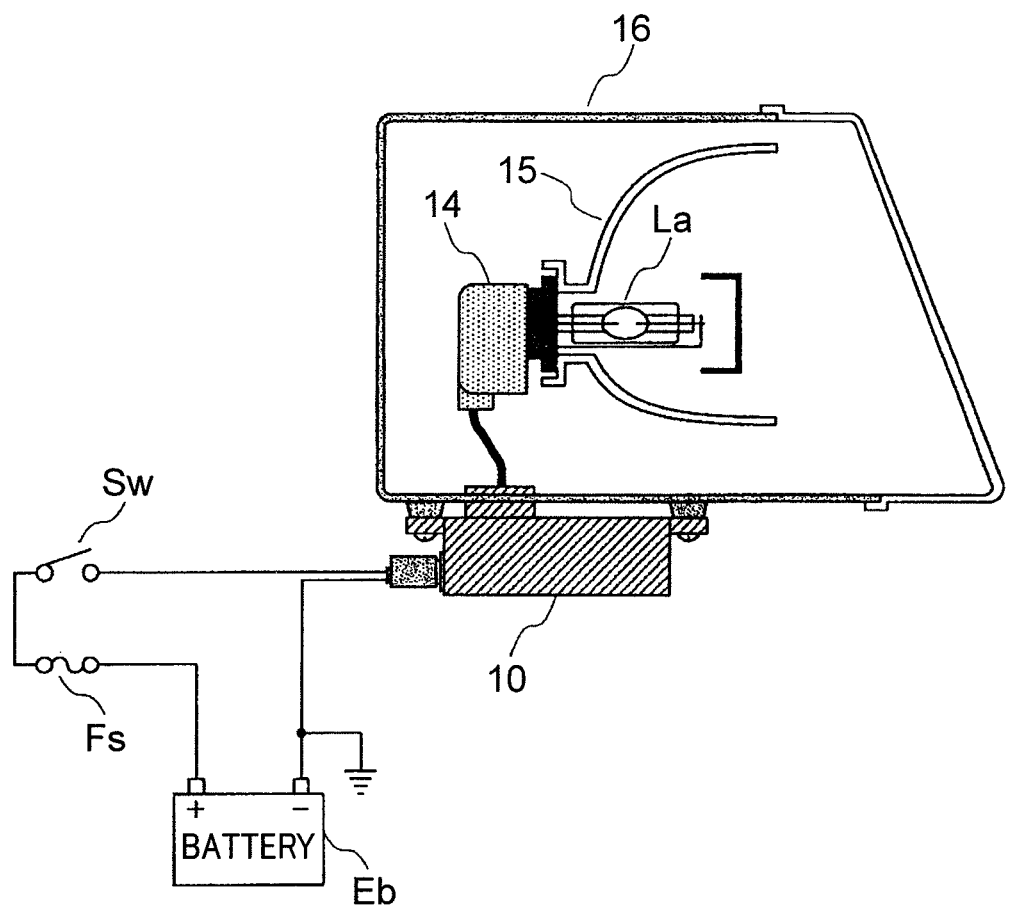
FIG. 13 is a schematic configuration diagram of a headlamp lighting device of Embodiment 5 of the present invention.
Figure 14:
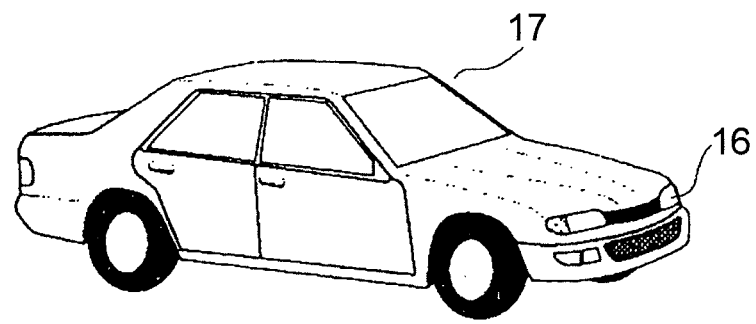
FIG. 14 is a perspective view showing a vehicle that is mounted with the headlamp lighting device of Embodiment 5 of the present invention.
Figure 15:
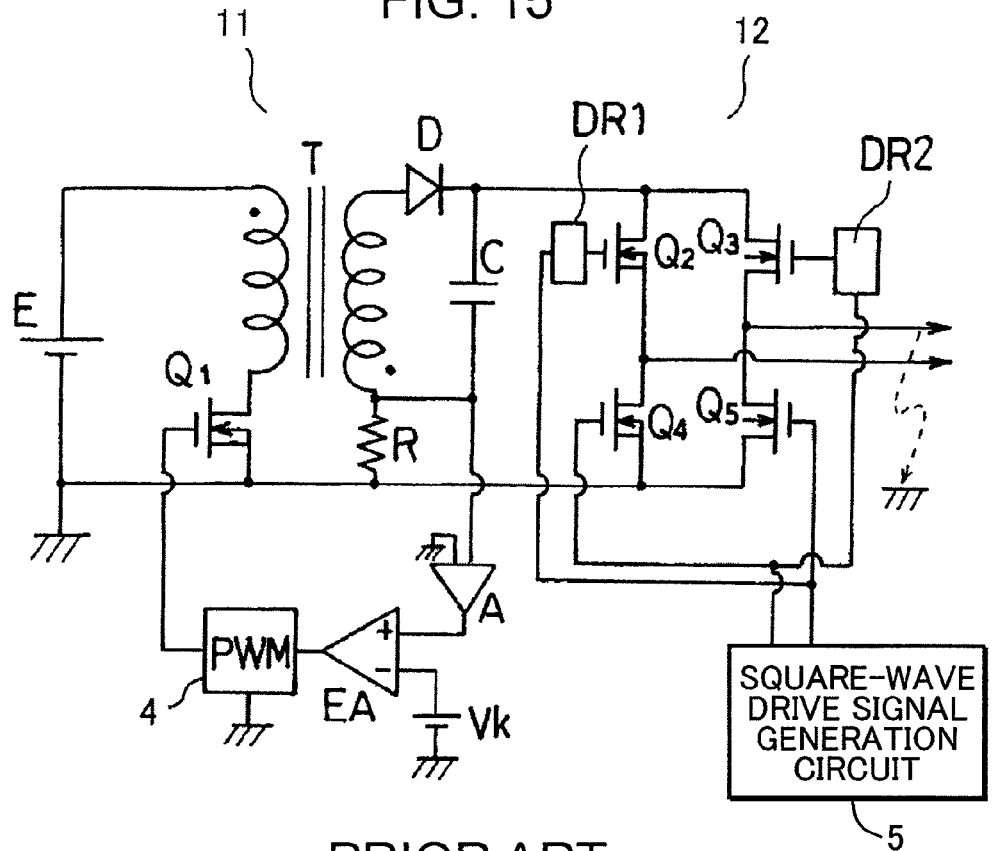
FIG. 15 is a circuit diagram of Conventional Example 1.
Figure 16:
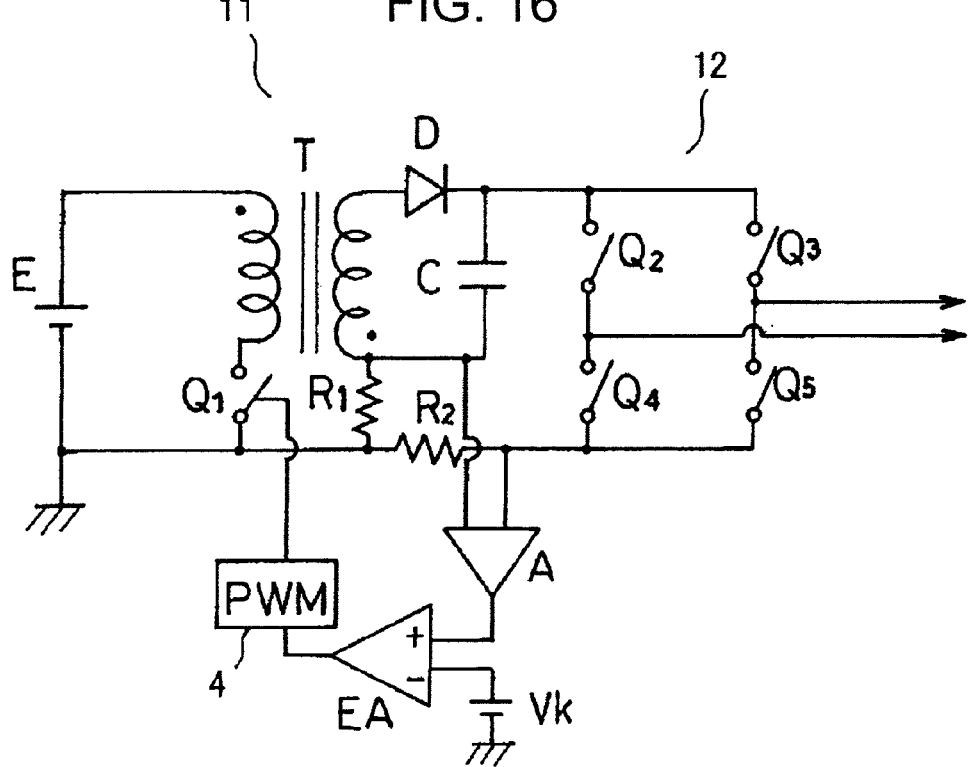
FIG. 16 is a circuit diagram of Conventional Example 2.

FIG. 13 shows how the discharge lamp lighting device of the present embodiment is applied as a headlamp 16 of an automobile 17 shown in FIG. 14.

In the diagram, a symbol La represents the high-intensity discharge lamp (HID lamp). Reference numeral 10 represents the discharge lamp lighting device, 14 a lamp socket, 15 a reflector, and 16 a headlamp fitting. The lamp socket 14 includes the starting circuit 13 described above. The discharge lamp lighting device 10 includes the power converter circuit 11, the polarity inverter circuit 12, and the control circuit S that are described above. A symbol Eb represents a battery serving as a direct-current power supply, Fs a fuse, and Sw a lighting switch.

The present embodiment is suitable for use in an automobile because a prompt ground fault detection, secure protection stop, and rapid lighting performance are required in order to ensure the safety of the automobile.

As shown in FIG. 1, one aspect of the present embodiment is provided with: a power converter circuit 11 having a configuration in which an input terminal to which a power supply E can be connected and an output terminal to which a load circuit including at least a lamp La can be connected are galvanically insulated, and having a power regulating function required by the lamp La; output detection means which is provided at the output terminal of the power converter circuit 11 and has first current detection means 1 and second current detection means 2; and a control circuit S for regulating an output of the power converter circuit 11 based on a result of detection performed by the output detection means, wherein one end of the output of the power converter circuit 11 is connected to one end of the load circuit via the first current detection means 1, one end of an input of the power converter circuit 11 is connected to the one end of the load circuit via the second current detection means 2, and the output current detection means has the result of the detection which is a synthesized signal of detection outputs of the first current detection means 1 and the second current detection means 2, a current pathway, through which a ground-fault current flows from the one end of the input of the power converter circuit 11 to the one end of the output of the power converter circuit 11 via the first current detection means 1 and the second current detection means 2, is formed when a ground fault occurs at a load terminal of the load circuit, and a detection signal of the first current detection means 1 and a detection signal of the second current detection means 2 that result from the ground-fault current are of additive polarities.

According to this configuration, the detection signal of the first current detection means 1 and the detection signal of the second current detection means 2, which result from the ground-fault current, are of additive polarities. Therefore, even when the ground fault occurs at either side of the output terminal to which the load circuit including the lamp La is connected, or even when the ground fault occurs when there is a certain level of impedance, the value indicated by the synthesized signal increases. Because the control circuit S controls the power converter circuit 11 based on this increase, the amount of power supplied to the lamp La can be reduced securely.

In one aspect of the present embodiment, it is preferred that a detection gain of the second current detection means 2 be at least three times greater than a detection gain of the first current detection means 1.

In the case of the high-intensity discharge lamp (HID lamp), normally the discharge lamp is turned off with ⅓ to ¼ of the lamp current used when the discharge lamp is lit steadily. Therefore, the discharge lamp can be turned off securely upon occurrence of the ground fault, by setting the detection gain of the second current detection means 2 to be at least approximately three times greater than the detection gain of the first current detection means 1.

Figure 8:
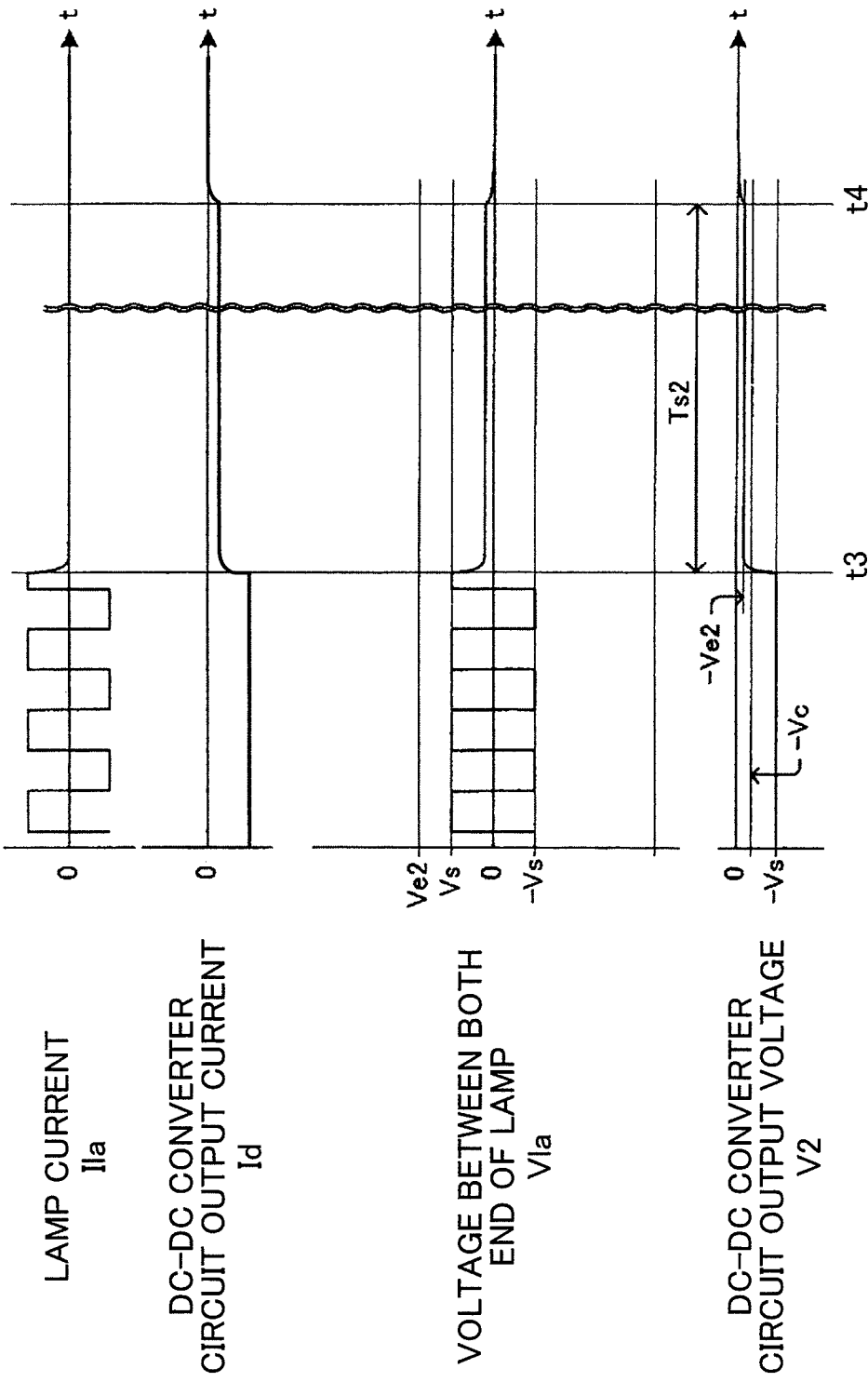
FIG. 8 is an operation waveform diagram of Embodiment 3 of the present invention.

In one aspect of the present embodiment, as shown in FIG. 6, the power converter circuit 11 outputs a direct-current voltage. The load circuit has an inverter circuit 12 that converts the direct-current voltage, which is output from the power converter circuit 11, into an alternating voltage output, and a discharge lamp load La that is lit by the alternating voltage output from the inverter circuit 12. The output voltage detection means outputs an inverter output voltage detection value V2 that is obtained by directly or indirectly detecting the output voltage of the inverter circuit 12. The control circuit S causes the inverter circuit 12 to stop a polarity inversion operation when the level of the inverter output voltage detection value V2 becomes equal to or lower than a first predetermined value Vc as shown in FIG. 8, and thereby keeps a polarity of the output of the inverter circuit 12 at a level where the level of the inverter output voltage detection value V2 is equal to or lower than the first predetermined value Vc. The control circuit S performs a protective operation when the level of the inverter output voltage detection value V2 remains equal to or lower than the first predetermined value Vc for a first predetermined time period Ts2.

According to this configuration, the polarity inversion operation is stopped. Therefore, the ground-fault state is maintained, so as to detect the ground fault easily, and to prevent the generation of an excessive current that is generated immediately after inverting the polarities of the outputs after the voltage of the output of the polarity with no ground fault increases.

The description "when the level of the inverter output voltage detection value V2 remains equal to or lower than the first predetermined value Vc for a first predetermined time period Ts2" means that the operation needs to be prevented from being stopped erroneously, since the lamp voltage Vla is extremely low immediately after the discharge lamp La starts discharging while it is cooled. The first predetermined value Vc may be set at the same value as the output short-circuit determination voltage.

In one aspect of the present embodiment, as shown in FIGS. 4, 5, 9 and 10, the power converter circuit 11 outputs a direct-current voltage. The load circuit has an inverter circuit 12 that converts the direct-current voltage, which is output from the power converter circuit 11, into an alternating voltage output, and a discharge lamp load La that is lit by the alternating voltage output from the inverter circuit 12. The output voltage detection means outputs an inverter output voltage detection value V2 that is obtained by directly or indirectly detecting the output voltage of the inverter circuit 12. The control circuit S performs a protective operation when the level of the inverter output voltage detection value V2 of one of output polarities of the inverter circuit 12 remains equal to or higher than a second predetermined value Vf for a second predetermined time period Ts1, as shown in FIG. 5 or 10.

This configuration has the following effects. Even when the time period Ts1 during which the half-wave discharge is canceled in a normal discharge lamp is exceeded, normally, it is determined that a ground fault occurs, as long as one of the output polarities constantly exceeds the turn-off determination voltage Vf. When it is determined that a ground fault occurs, the output of the DC-DC converter circuit 11 is stopped at the time point t2 shown in FIG. 5, whereby safe protection can be achieved. The second predetermined value Vf can be the turn-off determination voltage.

In one aspect of the present embodiment, as shown in FIGS. 11 and 12, the control circuit S performs control that uses the second predetermined value Vf, a third predetermined value Vop larger than the second predetermined value Vf, and a fourth predetermined value Vov larger than the third predetermined value Vop, and has a function for switching among control of the power converter circuit 11 that is performed such that the level of the inverter output voltage detection value V2 does not exceed the third predetermined value Vop when the discharge lamp La unintentionally enters a discharge stop state from a discharge state, and control that is performed such that the level of the inverter output voltage detection value V2 does not exceed the fourth predetermined value Vov, when it is detected or equivalently determined that the level of the inverter output voltage detection value V2 remains equal to or higher than the second predetermined value Vf in both polarities for a period of at least one cycle Tf.

According to this configuration, the output voltage is switched to the upper limit command (upper limit voltage) Vov after confirming that the ground fault did not cause the discharge lamp to fail. Accordingly, the discharge lamp can start discharging again. The second predetermined value Vf can be the turn-off determination voltage, and the fourth predetermined value Vov can be the upper limit voltage of the no-load open voltage.

In one aspect of the present embodiment, when causing the discharge lamp La to start discharging immediately after applying the power supply E thereto, the control circuit S controls the power converter circuit 11 such that the level of the inverter output voltage detection value V2 does not exceed the fourth predetermined value Vov when the discharge lamp La is turned off before starting to discharge.

According to this configuration, the discharge lamp can be started smoothly when applying the power supply thereto. The fourth predetermined value Vov is the upper limit voltage of the no-load open voltage.

In one aspect of the present embodiment, a potential of the one end of the output of the power converter circuit 11 can be higher than that of the other end (FIGS. 6, 7 and 9).

In one aspect of the present embodiment, the potential of the one end of the output of the power converter circuit 11 can be lower than that of the other end (FIG. 4).

In one aspect of the present embodiment, the protective operation can stop the operation of the power converter circuit 11.

In one aspect of the present embodiment, as shown in FIG. 7, the first current detection means can be the resistor R1, and the second current detection means can be the diode D2.

According to this configuration, since the second current detection means is the diode D2, stress on the circuit can be prevented at the moment when the ground fault occurs while the output voltage is high. Another resistor may be connected in parallel to the diode D2. In such a configuration, the potential at the point (a) can be prevented from inadvertently floating (being insulated) from the level of the circuit ground (GND).

One aspect of the present embodiment can be applied to a vehicle headlamp lighting device that uses the discharge lamp lighting device (FIG. 13).

The invention claimed is:

1. An illumination lighting device, comprising:
   a power converter circuit having a configuration in which an input terminal to which a power supply can be connected and an output terminal to which a load circuit including at least a lamp can be connected are galvanically insulated, and having a power regulating function required by the lamp;
   output detection portion which is provided at the output terminal of the power converter circuit and has first current detection portion and second current detection portion; and
   a control circuit for regulating an output of the power converter circuit based on a result of detection performed by the output detection portion,
   wherein one end of the output of the power converter circuit is connected to one end of the load circuit via the first current detection portion,
   one end of an input of the power converter circuit is connected to the one end of the load circuit via the second current detection portion,
   the output detection portion has the result of the detection which is a synthesized signal of detection outputs of the first current detection portion and the second current detection portion,
   a current pathway, through which a ground-fault current flows from the one end of the input of the power converter circuit to the one end of the output of the power converter circuit via the first current detection portion and the second current detection portion, is formed when a ground fault occurs at a load terminal of the load circuit, and
   a detection signal of the first current detection portion and a detection signal of the second current detection portion that result from the ground-fault current are of additive polarities.

2. The illumination lighting device according to claim 1, wherein a detection gain of the second current detection portion is at least three times greater than a detection gain of the first current detection portion.

3. A discharge lamp lighting device to which the illumination lighting device according to claim 1 is applied, wherein
   the power converter circuit outputs a direct-current voltage,
   the load circuit has an inverter circuit that converts the direct-current voltage, which is output from the power converter circuit, into an alternating voltage output, and a discharge lamp load that is lit by the alternating voltage output from the inverter circuit,
   the output detection portion outputs an inverter output voltage detection value that is obtained by directly or indirectly detecting the output voltage of the inverter circuit,
   the control circuit causes the inverter circuit to stop a polarity inversion operation when the level of the inverter output voltage detection value becomes equal to or lower than a first predetermined value, to thereby maintain the same polarity of outputs of the inverter circuit, and
   the control circuit performs a protective operation when the level of the inverter output voltage detection value remains equal to or lower than the first predetermined value for a first predetermined time period.

4. The discharge lamp lighting device to which the illumination lighting device according to claim 1 is applied, wherein
   the power converter circuit outputs a direct-current voltage,
   the load circuit has an inverter circuit that converts the direct-current voltage, which is output from the power converter circuit, into an alternating voltage output, and a discharge lamp load that is lit by the alternating voltage output from the inverter circuit,
   the output detection portion outputs an inverter output voltage detection value that is obtained by directly or indirectly detecting the output voltage of the inverter circuit, and
   the control circuit performs a protective operation when the level of the inverter output voltage detection value of one of output polarities of the inverter circuit remains equal to or higher than a second predetermined value for a second predetermined time period.

5. The discharge lamp lighting device according to claim 4, wherein
   the control circuit:
   performs control that uses the second predetermined value, a third predetermined value larger than the second predetermined value, and a fourth predetermined value larger than the third predetermined value; and
   has a function for switching :
   from control of the power converter circuit that is performed such that the level of the inverter output voltage detection value does not exceed the third predetermined value, when the discharge lamp unintentionally enters a discharge stop state from a discharge state;
   to control that is performed such that the level of the inverter output voltage detection value does not exceed the fourth predetermined value, when it is detected or equivalently determined that the level of the inverter output voltage detection value remains equal to or higher than the second predetermined value in both polarities for a period of at least one cycle.

6. The discharge lamp lighting device according to claim 5, wherein, when causing the discharge lamp to start discharging, the control circuit controls the power converter circuit such that the level of the inverter output voltage detection value does not exceed the fourth predetermined value when the discharge lamp is turned off before starting to discharge.

7. The discharge lamp lighting device according to claim 3, wherein a potential of the one end of the output of the power converter circuit is higher than that of the other end.

8. The discharge lamp lighting device according to claim 3, wherein a potential of the one end of the output of the power converter circuit is lower than that of the other end.

9. The discharge lamp lighting device according to claim 3, wherein the protective operation stops the operation of the power converter circuit.

10. The discharge lamp lighting device according to claim 3, wherein the first current detection portion is a resistor and the second current detection portion is a diode.

11. The discharge lamp lighting device according to claim 10, wherein the resistor is connected in parallel to the diode.

12. The discharge lamp lighting device according to claim 3, wherein the first predetermined value is an output short-circuit determination voltage.

13. The discharge lamp lighting device according to claim 4, wherein the second predetermined value is a turn-off determination voltage.

14. The discharge lamp lighting device according to claim 5, wherein the second predetermined value is a turn-off determination voltage and the fourth predetermined value is an upper limit voltage of a no-load open voltage.

15. The discharge lamp lighting device according to claim 6, wherein the fourth predetermined value is an upper limit voltage of a no-load open voltage.

16. A vehicle headlamp lighting device, which uses the illumination lighting device according to claim 1.

* * * * *